(12) United States Patent
Hoffman et al.

(10) Patent No.: US 10,502,448 B1
(45) Date of Patent: Dec. 10, 2019

(54) SELF-CLEARING VENTS BASED ON DROPLET EXPULSION

(71) Applicant: Government of the United States, as represented by the Secretary of the Air Force, Wright-Patterson AFB, OH (US)

(72) Inventors: Wesley P Hoffman, Palmdale, CA (US); Phillip G Wapner, Palmdale, CA (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 372 days.

(21) Appl. No.: 14/215,944

(22) Filed: Mar. 17, 2014

Related U.S. Application Data

(63) Continuation-in-part of application No. 12/559,909, filed on Sep. 15, 2009, now Pat. No. 8,679,233, which is a continuation-in-part of application No. 11/326,673, filed on Dec. 29, 2005, now abandoned, which is a continuation-in-part of application No. 10/340,381, filed on Jan. 2, 2003, now Pat. No. 6,982,787.

(60) Provisional application No. 60/344,063, filed on Jan. 2, 2002.

(51) Int. Cl.
*B01D 35/18* (2006.01)
*B01D 19/00* (2006.01)
*F24F 13/08* (2006.01)
*B01D 53/22* (2006.01)

(52) U.S. Cl.
CPC ........ *F24F 13/082* (2013.01); *B01D 19/0068* (2013.01); *B01D 19/0073* (2013.01); *B01D 2053/221* (2013.01)

(58) Field of Classification Search
CPC .......... B01D 1/00; B01D 1/0011; B01D 1/04; B01D 1/06; B01D 1/065; B01D 67/00; B01D 2311/2673; B01D 2313/38
See application file for complete search history.

(56) References Cited

U.S. PATENT DOCUMENTS

| | | | |
|---|---|---|---|
| 2,207,746 A | | 7/1940 | Maler |
| 4,208,284 A | | 6/1980 | Pretorius et al. |
| 4,233,029 A | * | 11/1980 | Columbus ........... B01L 3/50273 204/400 |
| 4,268,279 A | * | 5/1981 | Shindo ................ B01D 53/228 210/321.8 |
| 4,657,743 A | * | 4/1987 | Kanno ................ A61M 1/1698 210/321.64 |
| 4,688,938 A | | 8/1987 | Demoulin et al. |
| 5,080,484 A | | 1/1992 | Schneider et al. |

(Continued)

*Primary Examiner* — Bobby Ramdhanie
*Assistant Examiner* — Donovan Bui-Huynh
(74) *Attorney, Agent, or Firm* — AFMCLC/JAZ; Timothy Barlow

(57) ABSTRACT

A method of modifying the apparent wettability (the area contacted by a liquid) of solids with liquids by controlling the surface geometry or the capillary geometry. This modification is possible by understanding the geometric relationship between the contact angle and the included angle of surface features. This same geometric relationship can be used to enhance two-phase fluid separation during phase transformation as well as measure dynamic contact angles.

6 Claims, 17 Drawing Sheets

(56) References Cited

U.S. PATENT DOCUMENTS

| | | | |
|---|---|---|---|
| 5,137,352 A | 8/1992 | Blitshteyn et al. | |
| 5,143,744 A | 9/1992 | Barth et al. | |
| 5,271,846 A | 12/1993 | Uragami et al. | |
| 5,356,451 A | 10/1994 | Cain et al. | |
| 5,526,546 A | 6/1996 | Kamen | |
| 5,708,506 A | 1/1998 | Birang | |
| 5,815,256 A | 9/1998 | Fukunaga | |
| 5,838,445 A | 11/1998 | Sandhu et al. | |
| 5,861,946 A | 1/1999 | Hudson et al. | |
| 5,961,832 A | 10/1999 | Shaw et al. | |
| 6,221,955 B1 | 4/2001 | Mequanint et al. | |
| 6,222,184 B1 | 4/2001 | Kinnunen | |
| 6,232,521 B1 * | 5/2001 | Bewick-Sonntag | A61F 13/15203 604/358 |
| 6,280,883 B1 | 8/2001 | Lamanna et al. | |
| 6,288,157 B1 | 9/2001 | Jariwala et al. | |
| 6,291,022 B1 | 9/2001 | Hong et al. | |
| 6,299,981 B1 | 10/2001 | Azzopardi et al. | |
| 6,312,808 B1 | 11/2001 | Veerasamy et al. | |
| 6,340,192 B2 | 1/2002 | Pike et al. | |
| 6,353,051 B1 | 3/2002 | Huang | |
| 6,368,664 B1 | 4/2002 | Veerasamy et al. | |
| 6,370,947 B1 | 4/2002 | Casati et al. | |
| 6,508,859 B1 * | 1/2003 | Zia | B01D 19/0031 210/188 |
| 6,531,206 B2 | 3/2003 | Johnson et al. | |
| 6,581,438 B1 | 6/2003 | Hall et al. | |
| 6,867,854 B1 | 3/2005 | Wapner et al. | |
| 6,872,315 B2 | 3/2005 | Effenhauser et al. | |
| 6,982,787 B1 | 1/2006 | Wapner et al. | |
| 7,790,084 B1 | 9/2010 | Wapner et al. | |
| 2002/0146540 A1 * | 10/2002 | Johnston | E04F 15/02161 428/167 |

* cited by examiner

SELF-CLEARING VENTS BASED ON DROPLET EXPULSION

CROSS-REFERENCE TO RELATED APPLICATIONS

This application is a continuation-in-part of U.S. application Ser. No. 12/559,909, entitled "Modification of the Degree of Liquid Contact with a Solid by Control of Surface and Micro-channel Capillary Geometry," filed on Sep. 15, 2009, which is a continuation-in-part of U.S. application Ser. No. 11/326,673, entitled "Modification of the Degree of Liquid Contact with a Solid by Control of Surface and Micro-channel Capillary Geometry, "filed on Dec. 29, 2005, which is a continuation-in-part of U.S. Pat. No. 6,982,787, entitled "Modification of the Degree of Liquid Contact with a Solid by Control of Surface and Micro-channel Capillary Geometry", filed Jan. 2, 2003, which is a non-provisional of and claims the benefit to U.S. Application No. 60/344,063, entitled "Modification of Apparent Wettability of Liquids with Solids by Control of Surface and Micro-channel Geometry," filed Jan. 2, 2002, the entireties of which are incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

The wetting behavior of a liquid on a solid surface is a phenomenon of significant practical importance. The angle of liquid to solid contact on a solid surface is important in diverse areas of science and technology, such as, adhesion, adsorption, lubrication, catalysis, solid-liquid reaction kinetics, heat transfer, electrical conduction, and micro-fluidic devices. This angle of contact, called the contact angle ($\theta$), is one way to measure and assess the phenomenon of liquid-solid wetting.

The contact angle $\theta$ of a liquid on a surface may be used to define to what extent, if any, a liquid will "wet" or contact a surface. Whenever a liquid contacts a solid surface, several different types of behavior can be exhibited. At one extreme, a drop of liquid contacting a solid surface will spread out until it forms a thin film on the surface. This is called total wetting and in this case the liquid has a contact angle $\theta$ of zero with the surface. At the other extreme, a drop of liquid will sit on the surface like a marble with minimal contact. This behavior is termed total non-wetting and the liquid in this case forms a contact angle $\theta$ of 180° with the surface. For situations in between these extremes, a drop will be formed that makes a well-defined contact angle, $\theta$, with the surface. This is called partial wetting.

The standard historical convention applied to the partial wetting behavior is that if the contact angle is less than 90 degrees, the liquid "wets" the surface. If the contact angle is greater than 90 degrees, the liquid "does not wet" the surface and is termed "non-wetting". In the present document, the terms "wet", "wetting", "not wet", and "non-wetting" will be used to refer to this partial wetting behavior and not to the absolute definitions.

The intrinsic contact angle $\theta_i$ is the angle between a static liquid and a smooth planar horizontal surface. This contact angle is only dependent on the material properties of the liquid and the smooth planar horizontal surface. The apparent or observed contact angle $\theta_a$ will differ from the intrinsic contact angle due to contamination, imperfections, and/or roughness. (With the roughness being on a scale that is small compared to the size [diameter] of the drop.) In contrast to both the intrinsic and apparent contact angle, the dynamic contact angle $\theta_d$ is measured on a drop that is changing size or position and not necessarily on a horizontal surface. In this invention the term contact angle $\theta$ will be used as a general term encompassing whichever of these three contact angles that is applicable for the situation.

Because the wettability of liquids on solid surface is important to quantify, there have been many approaches used to measure the contact angle of a liquid on a solid surface. Prior art approaches have included the sessile drop method, the tilting plate method, the Wilhelmy plate, and the capillary rise method. Typically, the wettability of a surface is determined largely by the intrinsic contact angle $\theta_i$ that the liquid makes with the solid surface.

It should be noted that although the contact angle $\theta$, is the most common way to measure and assesses the phenomenon of liquid-solid wetting, it alone does not adequately describe all aspects of solid-liquid interaction in every situation. For example, the measurement of the contact angle alone is not always precise in quantifying the area of contact between a liquid and a solid surface. That is, the concept of wettability in its most precise definition is based on the contact angle that the liquid makes with the surface at the perimeter of the liquid. It does not deal, for instance, with the area of contact between the liquid and the solid surface.

In some situations it is desirable to be able to alter the wettability of a surface. That is, to be able to increase or decrease the area of the surface in intimate contact with the liquid. In the past, this has only been possible by changing the character of the liquid or of the solid in some manner, such as, by employing a liquid additive (for example, a surfactant), applying a surface coating, or changing the surface energy, for example. For some liquid-solid systems it is not desirable to modify either the solid surface or the liquid.

In this invention it will be demonstrated that it is easily possible to modify the area of liquid-solid contact by altering only the non-planar features on a solid surface or the shape of a capillary. The liquid-solid contact angle in this situation will remain unchanged. Thus, according to the definition of wettability, the wettability has not changed even though a casual observer would describe this transition in liquid-solid contact as changing from apparent wetting to apparent non-wetting behavior (or vice versa). Wetting and non-wetting do not at all convey the same meaning as fully contacting and partially contacting behavior between a liquid and a solid. Thus, although they can be used interchangeably in many situations, the degree or area of solid-liquid contact is preferable to the degree of wetting when describing the phenomena that this patent addresses.

Previously, knowledge of the relationship between the contact angle and the degree of solid-liquid contact was limited to planar horizontal surfaces and cylindrical capillaries. The relationship between contact angle and the area of solid-liquid contact on non-planar and non-horizontal surfaces as well as in capillaries with varying axial dimensions, cross-sectional shapes, and axial shapes has not previously been quantified. An understanding of the contact angle $\theta$ acting in concert with localized non-planar surface features or specific capillary geometries, which is one distinctive feature of this invention, may be used to increase or decrease the area of contact between a liquid and a solid surface.

In the prior art, the degree of contact of a liquid with a surface is determined solely by the contact angle θ that the liquid makes with the solid surface. In the present invention, the area of contact of a liquid with a surface or a portion of a surface has also been found to be influenced by the magnitude of the included angle δ in degrees between opposing portions of the surface(s) of the material(s). These opposing surfaces can take numerous forms, such as, plates, pits, pores, trenches, capillaries, etc. The applicants have found that there is a transitional included angle $\varphi_t$ for both wetting and non-wetting liquids at which wetting behavior and thus the area of contact between the liquid and the solid surface changes.

This type of surface modification has application in lubrication of sliding surfaces, fuel/catalyst interactions, adherence of coatings, heat transfer and any other solid-liquid combination with a desired wettability.

SUMMARY OF THE INVENTION

This invention provides a method of controlling the area of the surface in intimate contact with the liquid (degree of contact) by controlling the surface geometry of the solid. The surface geometry of the solid may comprise a plurality of surface discontinuities, such as pits, pores or trenches, having at least one solid included angle. On the other hand, it may comprise a plurality of capillaries with each capillary having at least one cross-sectional and/or one axial geometry. The cross-sectional and/or one axial geometry may include at least one capillary included angle.

Alternatively, this invention is able to control the entrance of liquids into and the flow of liquids through free-standing capillaries by proper selection of the cross-sectional and/or one axial geometry of the capillary. This control applies to both wetting as well as non-wetting fluids.

The invention may include a capillary device with a capillary path. The capillary path may carry different fluids in separate streams through the same capillary opening. These different fluids may consist of two or more immiscible non-wetting liquids or of one or more non-wetting liquids and a gas. In the case of two liquids, the first liquid has a first contact angle and the second liquid has a second contact angle. The second contact angle is designed to be greater than the first contact angle. The capillary device may include at least one angular portion and at least one open portion. The fluids are kept separate in the capillary by using angular features in the capillary wall that selectively exclude a liquid on the basis of its contact angle.

It is therefore an object of the present invention to control the wettability of a solid, i.e., the area of the solid contacted by a liquid, by controlling the surface geometry of the solid. It is another object of the invention to control the entrance of liquids into capillaries. It is still another object of the invention to provide a capillary device for carrying different fluids in separate streams through the same capillary opening.

These and other objects of the invention will become apparent as the description of the representative embodiments proceeds.

Portions of the present invention are described in the technical journal article "Partial Wetting Phenomenon on Nonplanar Surfaces and in Shaped Microchannels" authored by the present inventors and published in the American Chemical Society journal Langmuir 2002, 18, 1225-1230. Publication of this same article occurred on the world-wide-web on Jan. 12, 2002. The contents of these publications are hereby incorporated by reference herein.

Embodiments of the invention provide a self-clearing vent, based on a calculated transitional included angle, that allows the passage of a gas or a vapor through the vent, excludes the passage of liquid through the vent, and automatically removes condensed vapor from the interior surfaces of the vent. The vent comprises a metering section to which the two halves of the vent are attached axially along the major axis of the valve at their minimum dimension i.e. truncated vertex. To function, each half of the vent must possess at least one geometric feature with each geometric feature having at least one included angle and an ever expanding region from the truncated vertex in the direction of droplet expulsion.

In some of these embodiments, the at least two included angles are each between at least one pair of opposing faces in each half of the vent and the magnitude of the included angle is specified to determine the area of contact between the liquid and the solid surface; wherein the magnitude of the at least two included angles is based at least in part upon the transitional included angle, which is the included angle that differentiates complete liquid contact and partial liquid contact with the surface features.

In some embodiments of the self-clearing vent, the two halves of the vent are mirror images of one another.

In some embodiments of the self-clearing vent, the surface of the vent has a contact angle with the liquid to be excluded of at least 90°.

In some embodiments of the self-clearing vent, the surface of the vent has a contact angle with the liquid to be excluded of at least 150°.

In some embodiments of the self-clearing vent, the at least one pair of opposing faces in each half of the vent is coated or treated so that the contact angle between the surface of the vent and the liquid is at least 90°.

In some embodiments of the self-clearing vent, the metering section has a length L, a maximum separation dimension of D between the walls along its length that is essentially constant, and an L/D less than one.

In some embodiments of the self-clearing vent, the shape of the metering section is rectangular.

In some embodiments of the self-clearing vent, the shape of the two halves and the included angle in each half are not identical.

In some embodiments of the self-clearing vent, two or more metering sections are in close proximity to one another with each end of the two or more metering sections joined to and sharing common vent halves each containing an included angle as well as an ever expanding region.

Other embodiments of the invention provide a self-clearing vent, based on a calculated transitional included angle, that allows the passage of a gas or a vapor through the vent, excludes the passage of liquid through the vent, and automatically removes condensed vapor from the interior surfaces of the vent. The vent comprises at least one radial metering section to which the two halves of the vent are attached radially along the same radius of the valve at their minimum dimension i.e. truncated vertex. To function, each half of the vent must possess at least one geometric feature with each geometric feature having at least one included angle and an ever expanding region from the truncated vertex in the direction of droplet expulsion.

In some of these embodiments of the self-clearing vent, the at least two included angles are each between at least one pair of opposing faces in each half of the vent and the magnitude of the included angle is specified to determine the area of contact between the liquid and the solid surface; wherein the magnitude of the at least two included angles is based at least in part upon the transitional included angle, which is the included angle that differentiates complete liquid contact and partial liquid contact with the surface features.

In some of these embodiments of the self-clearing vent, the two halves of the vent are mirror images of one another.

In some of these embodiments of the self-clearing vent, the surface of the vent has a contact angle with the liquid to be excluded of at least 90°.

In some of these embodiments of the self-clearing vent, the surface of the vent has a contact angle with the liquid to be excluded of at least 150°.

In some of these embodiments of the self-clearing vent, the at least one pair of opposing faces in each half of the vent is coated or treated so that the contact angle between the surface of the vent and the liquid is at least 90°.

In some of these embodiments of the self-clearing vent, the metering section has a length L, a maximum separation dimension of D between the walls along its length that is essentially constant, and an L/D less than one.

In some of these embodiments of the self-clearing vent, the shape of the metering section is rectangular.

In some of these embodiments of the self-clearing vent, the shape of the two halves and the included angle in each half are not identical.

In some of these embodiments of the self-clearing vent, two or more metering sections are in close proximity to one another with each end of the two or more metering sections joined to and sharing common vent halves each containing an included angle as well as an ever expanding region.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

Figure 1A:
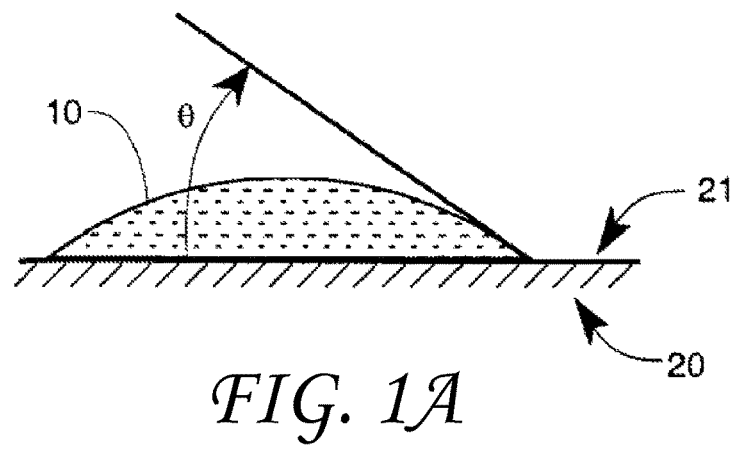
FIG. 1A shows a liquid to solid material contact angle that is greater than zero degrees and less than ninety degrees.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The following term definitions, consistent with their common meaning may help in understanding the disclosed invention.

"Liquid" refers to any substance composed of molecules that when unconstrained may move freely among themselves but do not tend to separate like a gas.

"Non-wetting liquid" refers to a liquid that forms a contact angle with a solid that is greater than 90 degrees.

"Solid" refers to a substance having a relative coherence of molecules and/or particles in a persistent form. Not a gas or liquid.

"Surface geometry" refers to any combination of accessible solid structure. The surface geometry may include any combination of protrusions and/or inclusions such as pillars, columns, pits, voids, capillaries etc.

"Discontinuity" refers to a void, pit, protrusion or other solid irregularity.

"Full contact" or "complete contact" for a non-wetting liquid occurs when the magnitude of the included angle δ or capillary included angle δ' in degrees is greater than the magnitude of the transitional included angle $\phi_{tnw}$ in degrees, such that the non-wetting liquid contacts the vertex of the included angle δ/δ'.

"Partial contact" for a non-wetting liquid occurs when the magnitude of the included angle δ or capillary included angle δ' in degrees is less than the magnitude of the transitional included angle $\phi_{tnw}$ in degrees such that the non-wetting liquid does not contact the vertex of the angle δ/δ'. E.g. the vertex of the angle formed by the solid is void of liquid.

"Contact angle" θ refers to an angle formed between a liquid and a solid surface. "Included angle" δ refers to an angle formed between two solid surfaces or by the sides of an inclusion into a solid surface such as a void or a capillary channel.

"Capillary included angle" δ' refers to an angle formed between two solid internal surfaces of the capillary.

The liquid "radius" r refers to the radius of a liquid droplet. It may also refer to the radius of curvature of a liquid in a void between two solid surfaces, wherein the liquid extends between the two surfaces but does not extent into the void vertex.

The subscripts "tnw" and "tw" may be used to differentiate between the non-wetting transitional included angle $\phi_t$ from the wetting transitional included angle $\phi_{tw}$.

"Transition included angle" $\phi_t$. The terms "transitional included angle" and "transitional angle" and "critical angle" and "angle of transition" as used herein may be regarded as making reference to the specific angle, whose magnitude is specified in degrees, at which a liquid sample changes behavior between the apparent wetting characteristics and the apparent non-wetting characteristics or vice versa. It is the angle between two solid sides at which the contacting behavior of a specific liquid changes from fully contacting to partial contacting or from partial contacting to fully contacting.

Figure 1B:
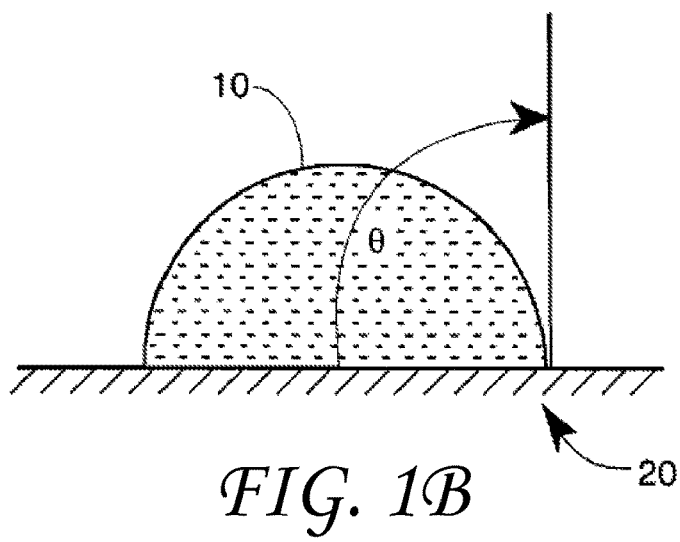
FIG. 1B shows a liquid to solid material contact angle that is equal to ninety degrees.
Figure 1C:
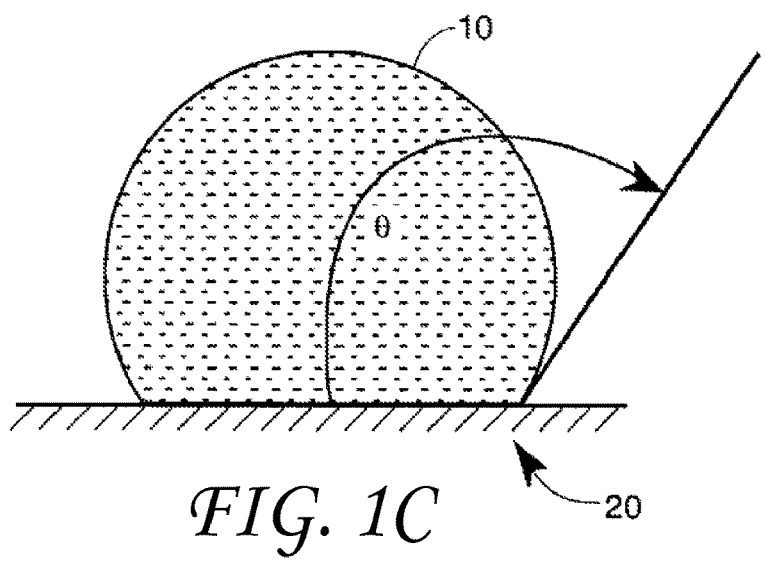
FIG. 1C shows a liquid to solid material contact angle that is greater than ninety degrees but less than one hundred eighty degrees.

FIGS. 1A, 1B, and 1C in the drawings illustrate drops that exhibit different contact angles. FIG. 1A shows a contact angle θ, between 0 degrees and 90 degrees, i.e., of about 45 degrees. FIG. 1B shows a contact angle θ of about 90 degrees. FIG. 1C shows a contact angle θ greater than 90 degrees but less than 180 degrees.

FIGS. 1A-1C show a solid 20 with a solid surface 21 and a liquid 10. As shown in FIGS. 1A-C, the liquid 10 has a contact angle θ, with the solid surface 21. FIG. 1A shows a contact angle θ of between about 0 degrees (0°) and about 90°. FIG. 1B shows a contact angle θ of 90°. FIG. 1C shows a contact angle θ greater than about 90° but less than about 180°. For a selected solid 20 and liquid 10, if the contact angle θ is less than about 90°, the liquid 10 will wet or contact the solid surface 21 of the solid 20 as shown in FIG. 1A. If the contact angle θ is about 90°, the liquid 10 may either wet or not wet the solid surface 21 as shown in FIG. 1B. If the contact angle θ is more than about 90°, the liquid 10 will not wet or contact the solid surface 21 as shown in FIG. 1C.

It has been previously assumed in the prior art that if the liquid does not wet the solid surface, that is, the contact angle is greater than 90°, the liquid will not totally contact and/or fill the pits and/or voids in the solid surface. It has also been previously assumed in the prior art that if the liquid does not wet the solid surface, the liquid will not enter a capillary spontaneously. However, it has been determined both theoretically and experimentally that these assumptions do not always reflect reality. The shape of the walls forming pits, voids, and/or capillaries should also be taken into account when determining whether a pit or void in the surface will be filled with the liquid, or if the liquid will enter a particular capillary.

Liquids with Contact Angles θ>90°

Figure 2A:
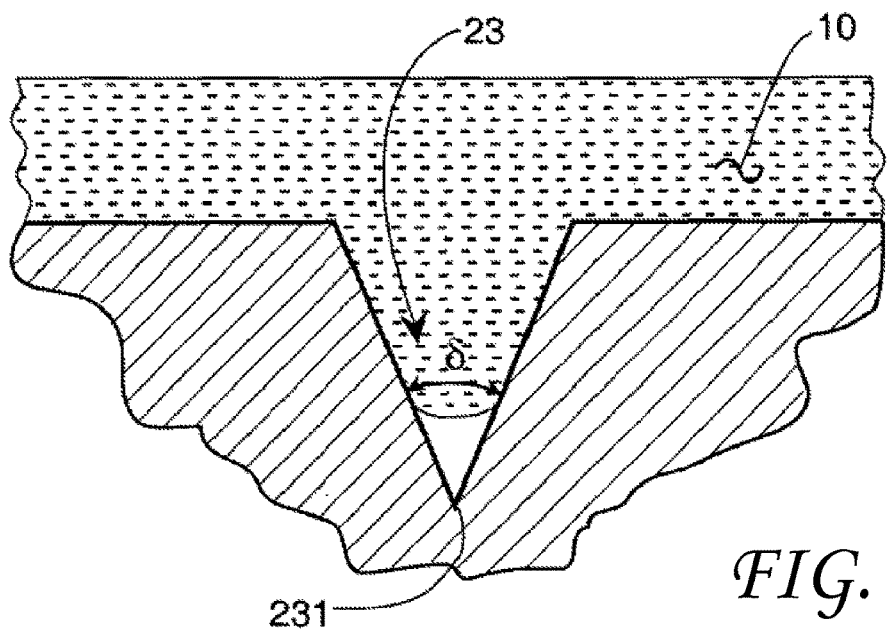
FIG. 2A shows a liquid in a surface void wherein the liquid does not reach the void vertex.
Figure 2B:
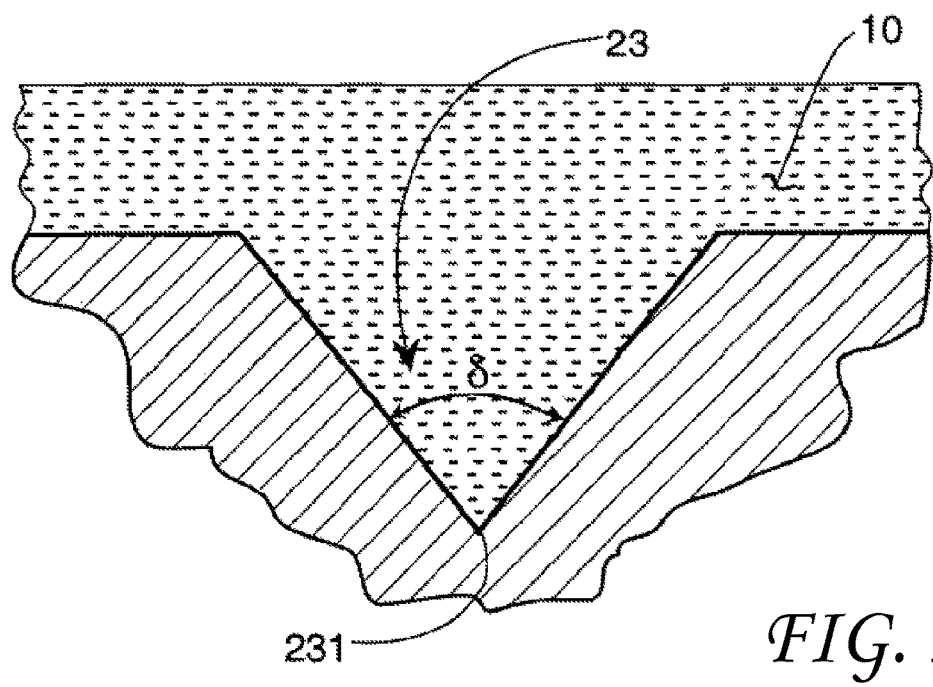
FIG. 2B shows a liquid in surface void 23 wherein the liquid does reach the void vertex.

FIGS. 2A and 2B are an expanded view of simplified surface void 23 having a vertex 231 and an included angle δ. FIG. 2A shows a liquid 10 with a contact angle θ>90° in the surface void 23 wherein the liquid 10 does not reach the void vertex 231. FIG. 2B shows the liquid 10 in the surface void 23 wherein the liquid 10 does reach the void vertex 231. The wettability or degree of contact of the surface void vertex 231 by the liquid 10 may be determined by the contact angle θ, the included angle δ and a transitional included angle $\phi_t$. In order to complete the analysis a transitional included angle $\phi_t$ must be calculated.

Figure 3:
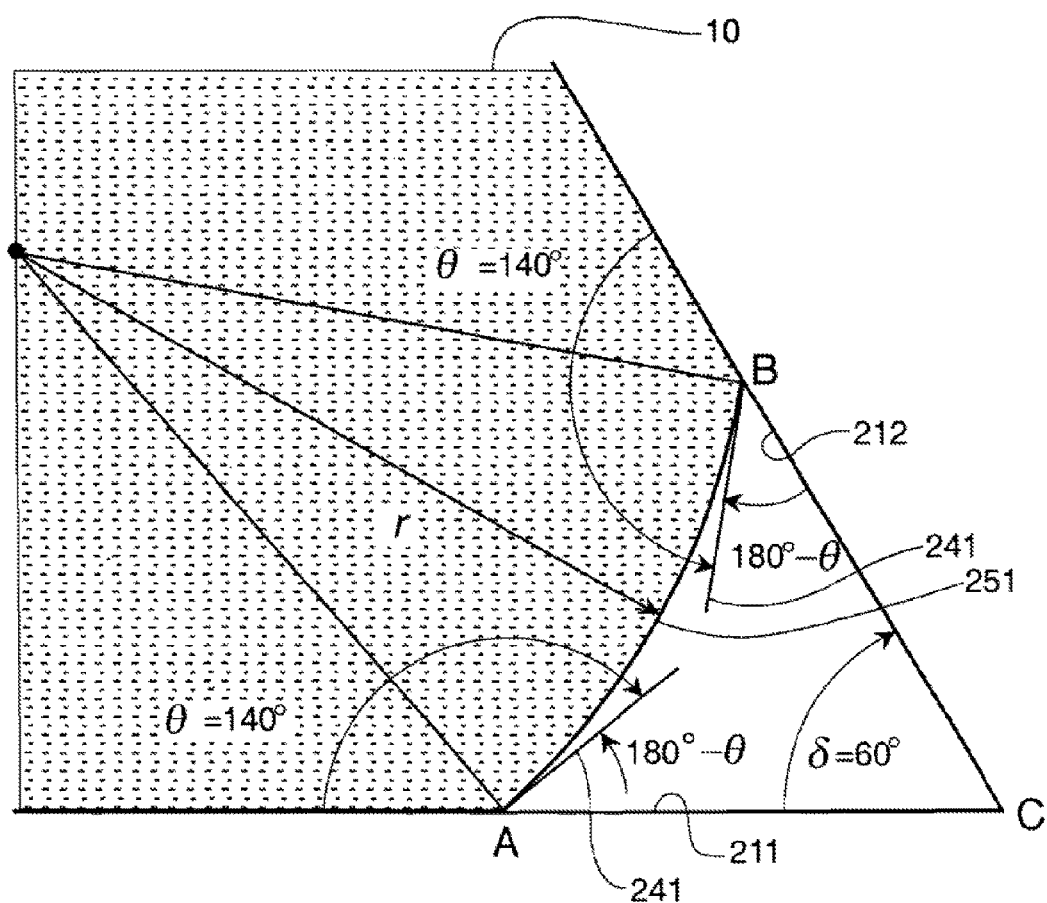
FIG. 3 shows a non-wetting liquid between a first solid surface and a second solid surface and the angular relationships with the contact angle θ.

FIG. 3 shows the non-wetting liquid 10 between a first solid surface 211 and a second solid surface 212. The surfaces could be planar as shown or alternatively a sectional view of another feature such as a cone. This non-wetting liquid has a radius r and a contact angle θ with both solid surfaces of about 140 degrees. The contact angle θ is measured at point B on the second solid surface 212 and at point A on the first solid surface. The vertex of the two surfaces is at point C. FIG. 3 also shows tangents 241 to the liquid surface 251 at the points of contact (points A & B) with the surface. The two plates are shown as intersecting at the vertex although this is not required. The angle formed by ACB, the actual angle formed by the solid, is called the included angle δ. The transitional included angle $\phi_t$ is the included angle δ at which the tangents 241 to the droplet surface 251 originating at points A and B form a straight line. In the example shown in FIG. 3 this would involve rotating the plates about the vertex to create a greater included angle. This transitional included angle $\phi_t$ may be used to differentiate between full contacting (liquid at the vertex C) and partial contacting by the liquid between the two solid surfaces 211 & 212 (no liquid at the vertex C), or in a void. An algebraic analysis of the sides and angles of FIG. 3 provides a means to calculate the transitional included angle $\phi_{tnw}$ for a non-wetting liquid. Thus, $$\phi_{tnw}=2\theta-180° \quad (\theta \geq 90°) \tag{1}$$

Figure 4:
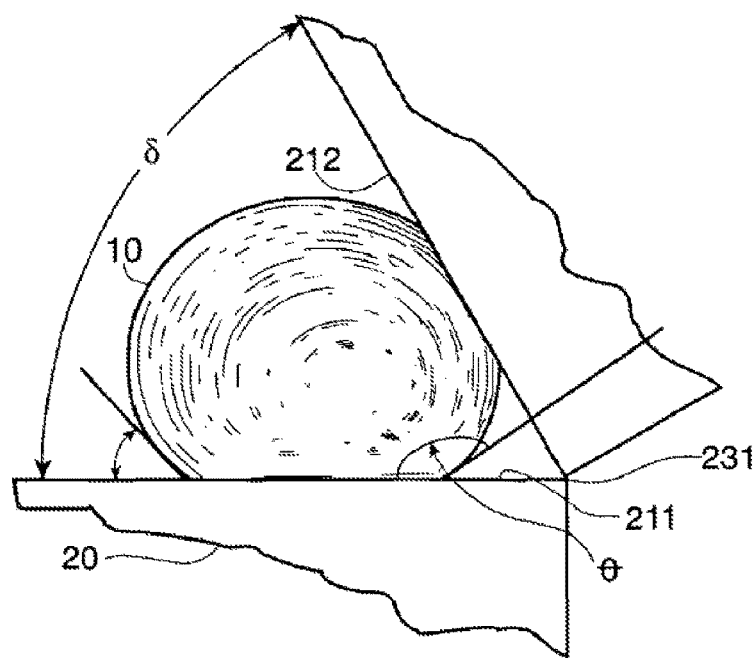
FIG. 4 shows a non-wetting partially contacting liquid (mercury) between two flat plates.
Figure 5:
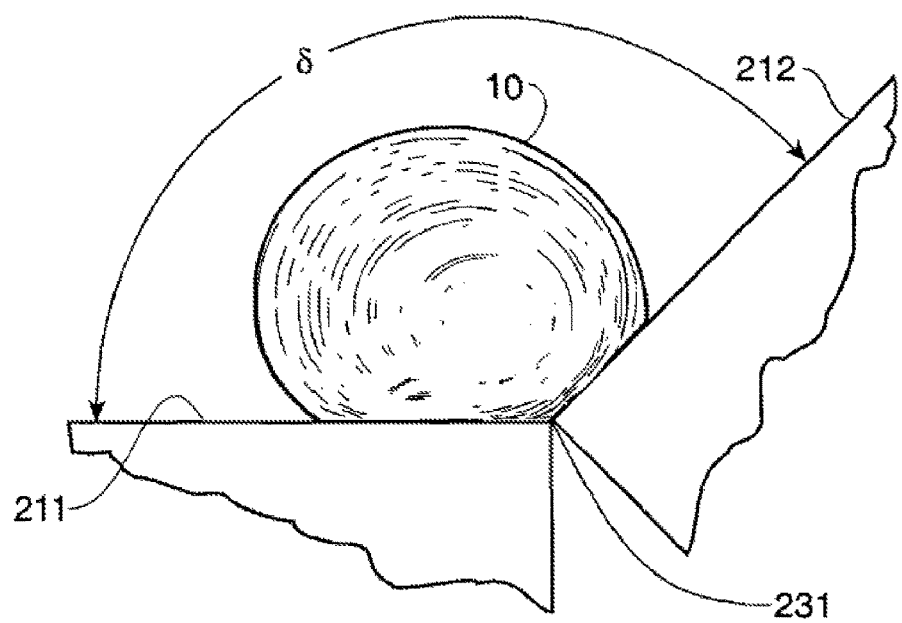
FIG. 5 shows a non-wetting fully contacting liquid (mercury) between two flat plates.

Consequently, for a non-wetting liquid, if the included angle, δ, whose magnitude is measured in degrees, between the surfaces of pieces of material, between the portions of the surface features of a material, or between opposing walls of a capillary, is greater than 20-180° the liquid will "wet" or completely contact the surfaces of the material that encompass the included angle δ. This condition is shown in the drawings of FIG. 5 herein. If the included angle δ is less than this value, the liquid will not "wet" or completely contact the surface and will withdraw from the vertex region 231 of the included angle δ as is shown in the drawing of FIG. 4.

The transitional included angle $\phi_{tmw}$ provides a method of predicting mathematically whether voids and capillaries with included angles may be too small for liquid penetration, or large enough to allow liquid penetration of an otherwise non-wettable material. In a like manner, the transitional included angles $\phi_{tmw}$ or $\phi_{tw}$ provide a method of predicting mathematically the entrance and/or flow of a wetting or non-wetting liquid in a capillary whose walls are not parallel along its entire length. The transitional included angles $\phi_{tmw}$ and $\phi_{tw}$ may be a specific angle or a range of angles.

The relationship between the transitional included angle $\phi_{tmw}$ and the contact angle $\theta$ that the non-wetting liquid makes when in contact with the solid surface is given by equation 1. Substituting the value of the contact angle $\theta$ for mercury on glass into this equation gives a transitional included angle $\phi_{tmw}$ of 100°, which agrees with experimental results.

By rearranging equation 1, one obtains equation 2:

$$\theta = (\phi_{tmw} + 180°)/2 \, (\theta \geq 90°) \quad (2)$$

Equation 2 shows that the contact angle $\theta$ of a non-wetting liquid can be easily calculated once the transitional included angle $\phi_t$ for the liquid on the desired surface is known.

It has been discovered that the degree of contact between a liquid 10 and a solid 20 can be influenced by the designed and measured modification of the pits, pores, capillaries, trenches, voids and other liquid access points in a solid surface as well as shaped protrusions on the surface.

In one example shown in FIG. 4, the non-wetting liquid 10 is mercury that has a contact angle $\theta$ of about 140° with both the first solid surface 211 on which liquid 10 rests as well as the second solid surface 212 of the solid 20. The first solid surface 211 and the second solid surface 212 can be rotated with respect to a vertex 231 to form any included angle $\delta$ between about 0 degrees and about 180 degrees. As can be seen in FIG. 4, and calculated from the above equations, at an included angle $\delta$ of about 60°, the liquid 10 is excluded from the vertex 231 intersection of the two solid surfaces 211/212 (i.e., from the interstice region between the two plates). However, if the included angle $\delta$ were increased to about 135° as shown in FIG. 5, the non-wetting liquid 10 may fill the vertex 231 intersection of the two solid surfaces 211/212. Clearly there may be a change in the behavior of the liquid 10 as the included angle $\delta$ is varied between about 60° and about 135°. This analysis may be applied to surface voids having predicable or otherwise known included angles to calculate the wettability of the voids and thus the solid in general. The complete surface wettability of surface voids may be similarly analyzed based upon the void included angle $\delta$ and its relationship to the transitional included angle $\phi_t$, and the contact angle $\theta$.

The above analysis could also be applied to three-dimensional shapes. For example, the behavior of mercury in conical shaped pits could be examined. Cones of PLEXIGLAS® having an included angle $\delta$ of 60° and 82° and coated with silicon vacuum grease from Dow Corning Corporation could be used. Since the mercury was contacting the vacuum grease, the grease would establish the contact angle $\theta$ as being 125°. According to equation 1, a transitional included angle $\phi_t$ of two times 125 degrees minus 180 degrees, should result in a transitional included angle $\phi_t$ of about 70 degrees. From this calculation, it would be expected that when mercury is introduced into the two coated pits, complete contact by the mercury with the vertex would occur in the conical pit having an included conical angle $\delta$ of 82 degrees, but not in the conical pit having a conical angle $\delta$ of 60 degrees. This was found to be the case.

Thus, equation 1 also applies to three-dimensional features. These features may be depressions in the surface or elevations in the surface in the form of pillars, pyramids, etc.

Contact Angle on Non-Planar Surfaces

As previously shown in FIGS. 2A and 2B, the wettability of the solid contacted by a non-wetting liquid may be controlled by controlling the surface geometry of the solid. The surface geometry of the solid may include voids, pits, and protrusions that have included angles $\delta$ greater than the transitional included angle $\phi_t$ to increase the area of contact between the liquid and the surface of the solid. Alternatively, a void included angle $\delta$ less than transitional included angle $\phi_t$ may be used to decrease the area of contact between the liquid and the surface of the solid surface.

Figure 6:
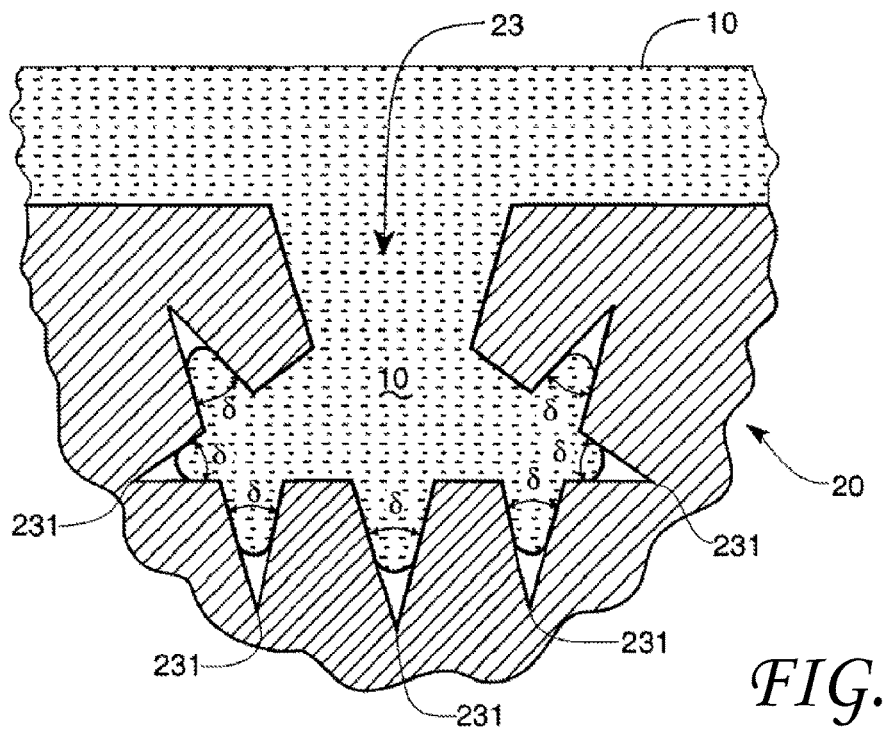
FIG. 6 shows a solid with a void having about 7 void included angles δ wherein the non-wetting liquid does not reach the void vertices.

In some embodiments, the solid surface geometry may comprise a plurality of surface discontinuities. These surface discontinuities (voids, etc.) may have the same or different dimensions with one or more void included angles $\delta$ such as shown in FIG. 6. FIG. 6 shows a solid 20 with a void 23 having about 7 void included angles $\delta$, which may be the same or different dimensions. In FIG. 6, the included angles $\delta$ are less than the transitional included angle $\phi_t$ and complete contact between the non-wetting liquid 10 and the void vertex 231 does not occur.

Figure 7:
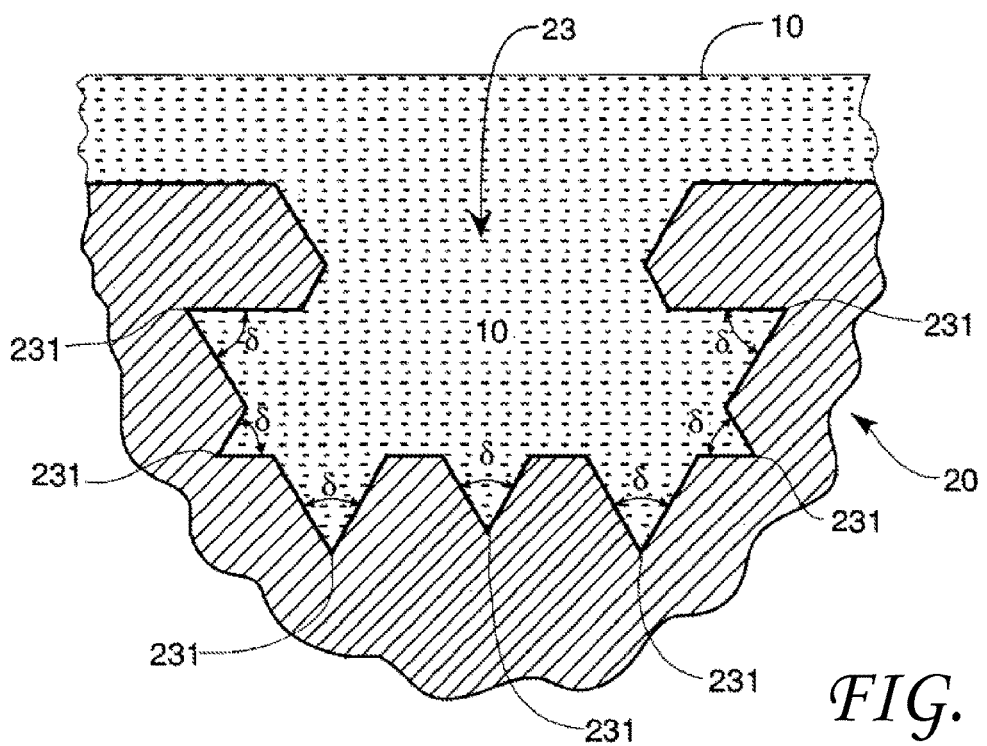
FIG. 7 shows a solid with a void having about 7 void included angles δ wherein the non-wetting liquid does reach the void vertices.

FIG. 7 shows a solid 20 with a void 23 having about 7 void included angles $\delta$, which may be the same or different dimensions. In FIG. 7, the included angles $\delta$ are greater than the transitional included angle $\phi_t$ and complete contact between the non-wetting liquid 10 and the void vertex 231 occurs. Clearly, such perfect fractal geometry does not need to be in place. All that needs to exist are corners with included angles greater than the transitional included angle $\phi_t$ for complete contact with the void surface. It should be noted that although FIGS. 2A, 2B, 6, and 7 are drawn in two-dimension for convenience, the voids can be either two dimensional or 3-dimensional. That is, for example, the voids represented by these figures can be formed by the intersection of plates, may be conical in shape, or possess another 3-dimensional shape.

The change in wetting behavior as a function of geometry can occur on a variety of scales from the macro-scale to the nano-scale. In addition, this selective alteration of the wetting behavior of a liquid on a particular surface can occur in a number of different ways. For example, one can modify the wetting behavior of a liquid on a surface by the arrangement of discrete pieces of material such as plates, by controlling the cross-sectional shape of a capillary or pore, or by modifying the surface topology by patterning or shaping of the surface on any scale. This patterning or shaping of the surface can involve a portion of the surface or the entire surface, can be regular or irregular, can involve depressions or elevations, and can be accomplished by a variety of means, such as mechanical means, energetic beams, physical or chemical processes, as well as a combination of these such as in photo-lithography. This may enable a wettability change on the surface of the solid without changing the chemical character or surface energy of the solid.

Capillaries with Non-Circular Cross-Sections

If a liquid wets a solid material, it will spontaneously flow into a capillary formed by that solid material. Likewise, a non-wetting liquid will not spontaneously flow into a capillary, and will only do so if pressure is applied. However, this traditional viewpoint assumes the diameter of the capillaries involved remains constant (linear) and/or the capillary is round (circular). If the diameters do not remain constant, but vary in axial dimensions (commonly known as taper) and/or if the wall is composed of non-circular shapes, flow into or exclusion from a capillary, or a portion of the capillary cross-section, may or may not take place depending on the included angle formed by the walls of the capillary (capillary included angle δ'). This capillary included angle δ' can have any orientation with respect to the capillary principle axis. Thus, traditional viewpoints of whether or not a liquid will enter a capillary spontaneously need to be modified to include the very important effect of geometry.

Figure 8A:
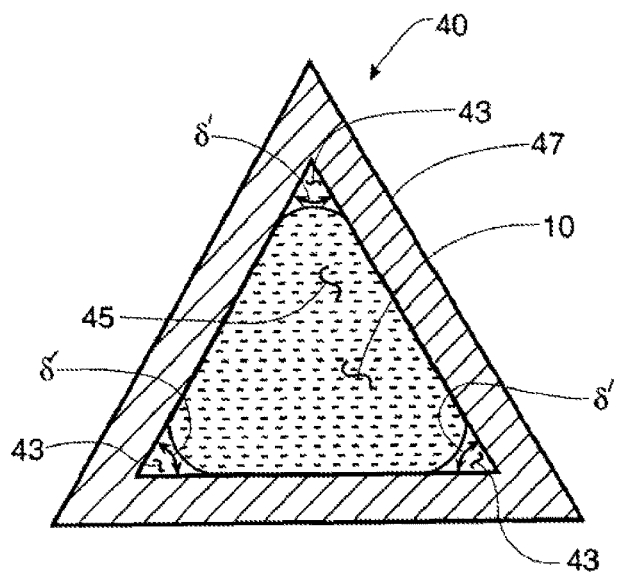
FIG. 8A shows a triangular capillary cross sectional geometry embodiment.
Figure 8B:
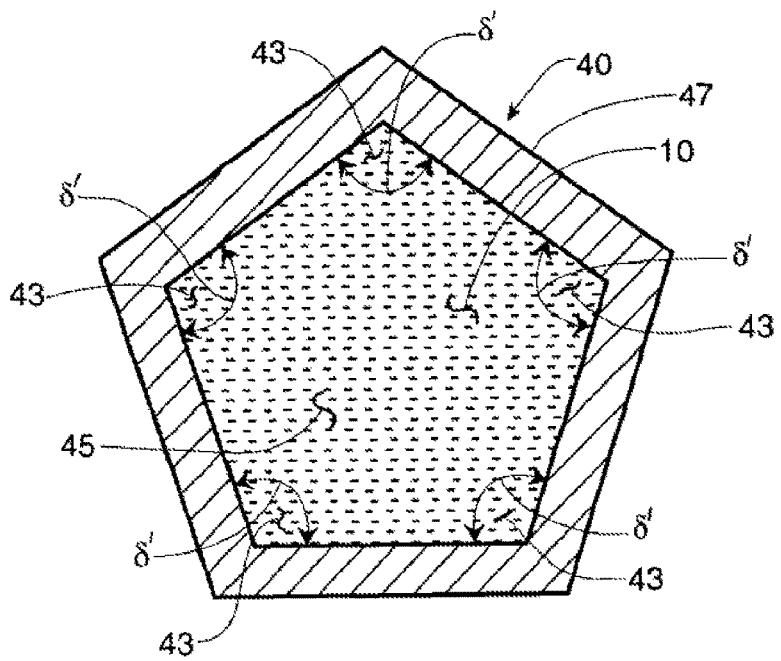
FIG. 8B shows a pentagon capillary cross sectional geometry embodiment.

The surface geometry of a solid may comprise a plurality of capillaries or the capillaries may be free-standing, i.e., single discrete capillary tubes. Each capillary has a cross-sectional geometry. FIG. 8A and FIG. 8B show two capillary cross-sectional geometry embodiments formed by the capillary wall 47. The capillary walls are shown with a uniform wall thickness for convenience. The wall thickness is immaterial to the invention so long as the fluid present does not distort the capillary dimensions. FIG. 8A shows a capillary 40, a non-wetting liquid 10 within the capillary 40 and a capillary path 45. In FIG. 8A, the non-wetting liquid 10 does not fill the capillary path 45 in a capillary vertex 43 region of the capillary included angles δ '.

FIG. 8B shows a capillary 40, a non-wetting liquid 10 within the capillary 40 and a capillary path 45. In FIG. 8B, the non-wetting liquid 10 fills the capillary path 45 in the vertex 43 region of the capillary included angles δ '. It is assumed, of course, that the contact angle θ is of such a value that this behavior would take place. If the contact angles θ were close enough to 90 degrees, even the three-walled polygon of FIG. 8A would be completely filled.

In addition to producing a desired interior capillary cross-section by shaping the capillary wall itself as seen in FIGS. 8A and 8B, it is also possible to produce the desired included angles δ ' in the interior capillary surfaces from depressions or protrusions in the capillary walls 47 themselves or by employing an insert into the capillary.

Figure 8C:
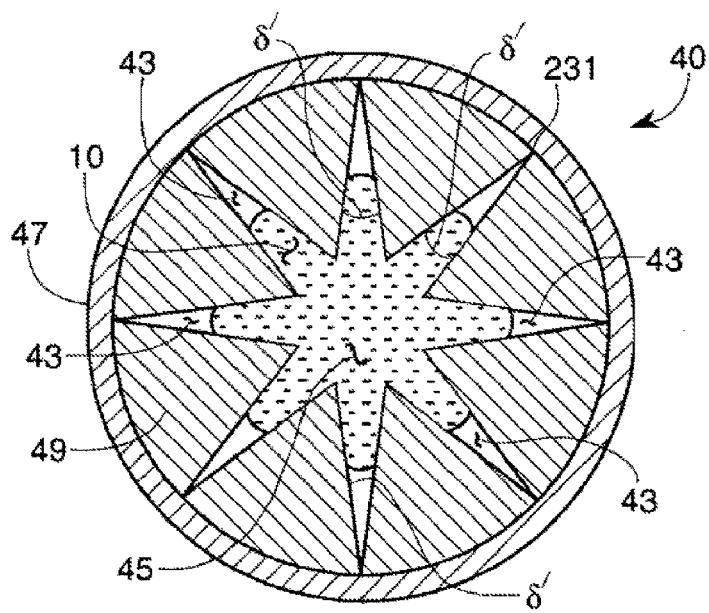
FIG. 8C shows a capillary cross sectional geometry embodiment with a non-wetting liquid.
Figure 8D:
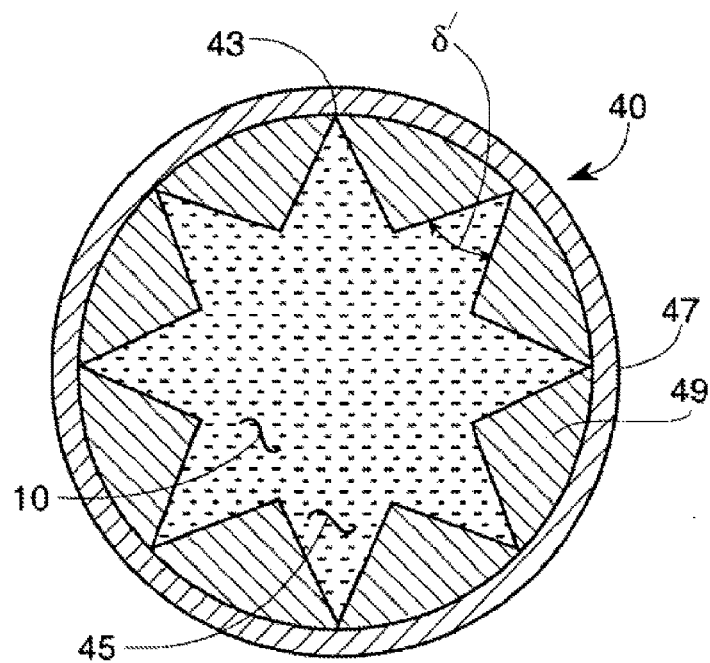
FIG. 8D shows a capillary cross sectional geometry embodiment with a non-wetting liquid.

FIG. 8C and FIG. 8D show two capillary 40 cross-sectional geometry embodiments formed by an insert 49 placed inside the capillary wall 47. FIG. 8C and FIG. 8D illustrate flow of a non-wetting liquid in the capillary path 45 having multiple angled portions. FIG. 8C shows the capillary 40 with the path 45. The capillary path 45 includes 8 capillary included angles δ ' and 8 capillary vertex regions 43. The liquid 10 is within the capillary path 45 but does not fill the capillary path 45 in the vertex 43 region of the capillary included angles δ '.

FIG. 8D shows a capillary 40 having a capillary path 45. The capillary path 45 includes 8 capillary included angles δ ' and 8 capillary vertex regions 43. The liquid 10 is within the capillary path 45 and does fill the capillary path 45 in the vertex 43 region of the capillary included angles δ '. The liquid 10 fills the capillary path 45 in the vertex 43 of the capillary included angles δ' because the included angle δ' is greater than the transitional included angle $\phi_t$.

Capillary Device

Figure 9:
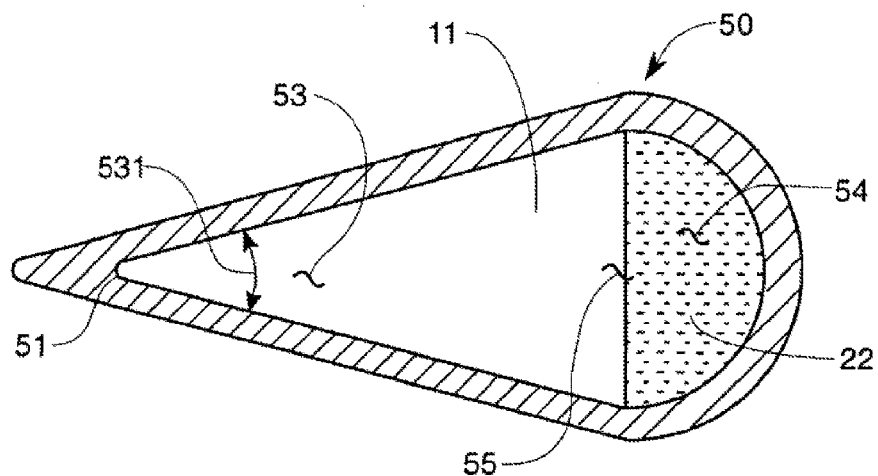
FIG. 9 shows a capillary device cross sectional geometry embodiment.

The flow restrictions of various liquids near the vortex of the capillary may be used to create a capillary device 50 as shown in FIG. 9 in cross-section. The capillary device 50 includes a capillary device path 55 that may carry different immiscible non-wetting liquids in separate streams through different regions of the same capillary device path 55. Alternatively, the capillary device path 55 may carry a gas in combination with one or more immiscible non-wetting liquids in one or more separate streams through different regions of the same capillary device path 55. The capillary device 50 may include at least one angular portion 53 with a capillary included angle 531 and at least one open portion 54. The capillary open portion 54 may be curved as shown in FIG. 9 or include a capillary included angle δ' greater than the transitional included angle $\phi_t$ of the liquid/solid combination. Either would allow the liquid to flow in the open portion 54.

Such a capillary design could have several uses. For example, two non-wetting liquids with different contact angles θ and thus different transitional included angles $\phi_t$ may be kept separate in the same capillary device 50 using geometric means as shown in FIG. 9. A first liquid 11 with a first transitional included angle $\phi_{tnw1}$ and a second liquid 22 with a second transitional included angle $\phi_{tnw2}$ may flow separately in the same capillary channel 55. The second transitional included angle $\phi_{tnw2}$ would be designed to be greater than the first transitional included angle $\phi_{tnw1}$ such that only the first liquid 11 would flow in angular portion 53 in the space near the capillary included angle 531 and vertex 51. In one embodiment, the angular portion 53 is designed to have an angle 531 less than the second transitional included angle $\phi_{tnw2}$ and greater than the first transitional included angle $\phi_{tnw1}$ so that only the first liquid will flow in the angular portion 53 of the capillary. This geometric dependence of flow into or within a capillary device 50 can also be used to separate fluids in a mixture, for example, by allowing entrance to one or more liquids and denying access to the others. Alternatively, a liquid can occupy a portion of the capillary while a gas occupies the space near and in the capillary included angle 531 and vertex 51.

Liquids with Contact Angles<90°

Figure 10:
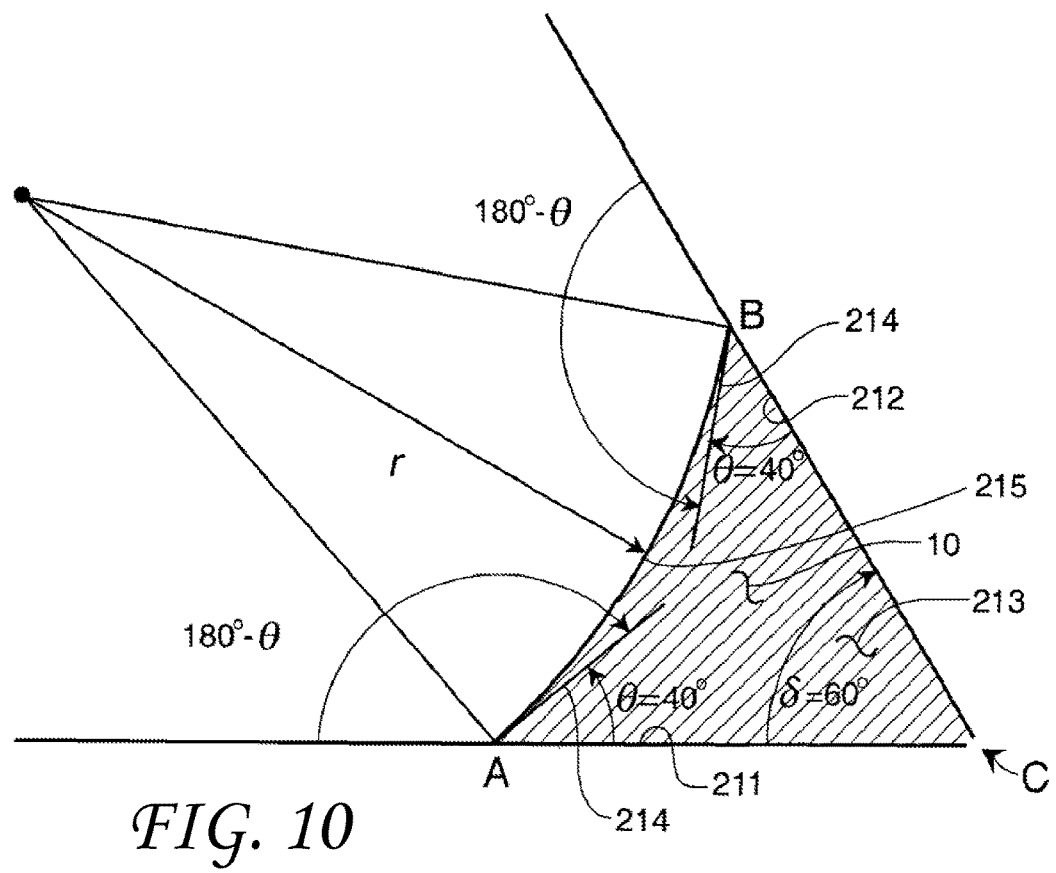
FIG. 10 shows a wetting liquid between a first solid surface and a second solid surface and the angular relationships with the contact angle θ.

FIG. 10 shows a wetting (contact angle θ<90°) liquid 10 between a first solid surface 211 and a second solid surface 212. The surfaces could be planar as shown or alternatively a sectional view of a cone, tapered capillary, or other 3-dimensional volume. This wetting liquid has a radius r and a contact angle θ with both solid surfaces of about 40 degrees. The contact angle θ is measured at point B on the second solid surface 212 and at point A on the first solid surface. The vertex of the two surfaces is at point C. It can be seen that the vertex (point C) is truncated to allow the entrance of the wetting liquid into an interstice 213. The angle formed by ACB, the actual angle formed by the solid surfaces, is called the included angle δ. In a manner similar to that shown for a non-wetting liquid in FIG. 3, whenever a wetting liquid has a contact angle, e, with a solid surface that is less than 90 degrees, a relationship exists between an angle δ formed between two segments of that surface that determines whether or not liquid will enter the included angle through interstice 213. It should be noted that although the situation is similar between FIGS. 3 and 10, there is a major difference. In FIG. 3, since the liquid is non-wetting it will not flow into the apex on its own accord, and will only enter if the included angle is greater than the transitional angle. In FIG. 10, the wetting liquid may enter vertex C on its own accord regardless of included angle δ if a significant quantity of liquid 10 was placed on either the first solid surface 211 or the second solid surface 212. The wetting liquid may also enter the vertex C on its own accord if the vertex C is lower than both surfaces. Thus, in FIG. 10, the liquid 10 is placed on the outside of the first solid surface 211 or the second solid surface 212 and only enters the interstice 213 if the included angle δ is less than the transitional included angle.

The transitional included angle for a wetting liquid, $\phi_{tw}$, is the included angle δ at which the tangents 214 to the droplet surface 215 originating at points A and B form a straight line. In the FIG. 10 example this would occur by increasing the included angle δ between the first solid surface 211 and the second solid surface 212. This transitional included angle $\phi_t$ may be used to differentiate between filling and non-filling behavior of the vertex C formed between the first solid surface 211 and the second solid surface 212. An algebraic analysis of the sides and angles of FIG. 10 provides the following equation for a wetting liquid.

In this case, the transitional included angle $\phi_{tw}$ is:

$$\phi_{tw}=180°-2\theta(\theta\leq90°) \quad (3)$$

The contact angle $\theta$ is the angle that the liquid 10 makes with the solid surfaces 212/211, both of which may be flat or curved solid surfaces.

As in the case of non-wetting liquids, equation 3 can be rearranged so that the contact angle $\theta$ between a wetting liquid and a surface may easily be determined by measuring the transitional included angle $\phi_{tw}$. Rearranging equation 3 gives:

$$\theta=(180°-\phi_{tw})/2(\theta\leq90°) \quad (4)$$

A similar phenomenon to equation 1 for non-wetting liquids applies to "wetting liquids" having a contact angle $\theta$ with a solid surface that is between 0 degrees and 90 degrees. In exactly the same manner, it is easily demonstrated, both theoretically and experimentally, that a wetting liquid will only enter a capillary, pore, or corner from the smaller end, if the included angle $\delta$ is less than the transitional included angle ($\phi_{tw}$) given in equation 3.

Thus, it is not the relationship between the included angle and the contact angle that determines increased or decreased contact. It is the relationship between the included angle and the transition included angle. For wetting fluids, increased contact occurs if the included angle is less than the transitional included angle and for non-wetting fluids, increased contact occurs if the included angle is greater than the transitional included angle.

Figure 11:
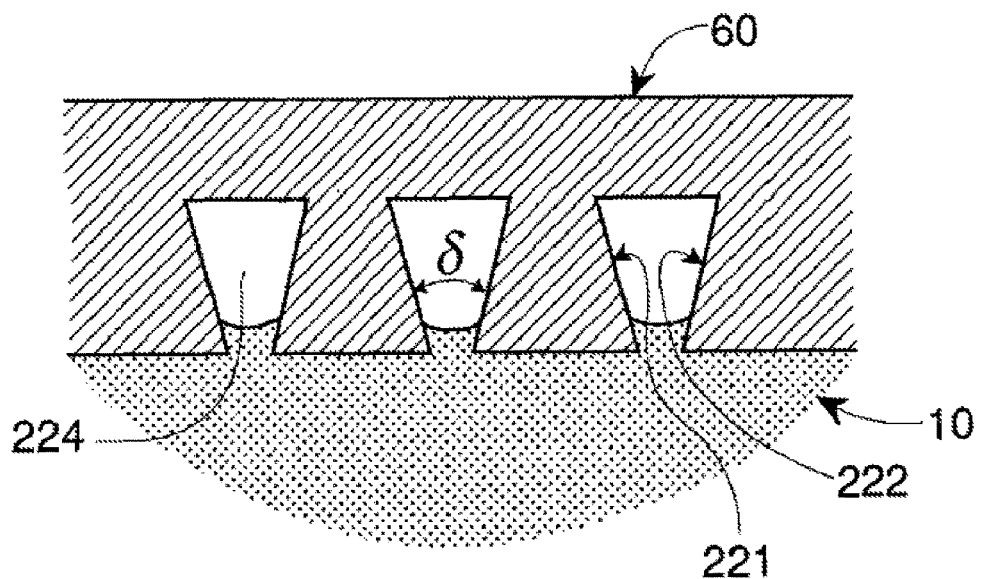
FIG. 11 shows a capillary cross sectional geometry embodiment with a wetting liquid.
Figure 12:
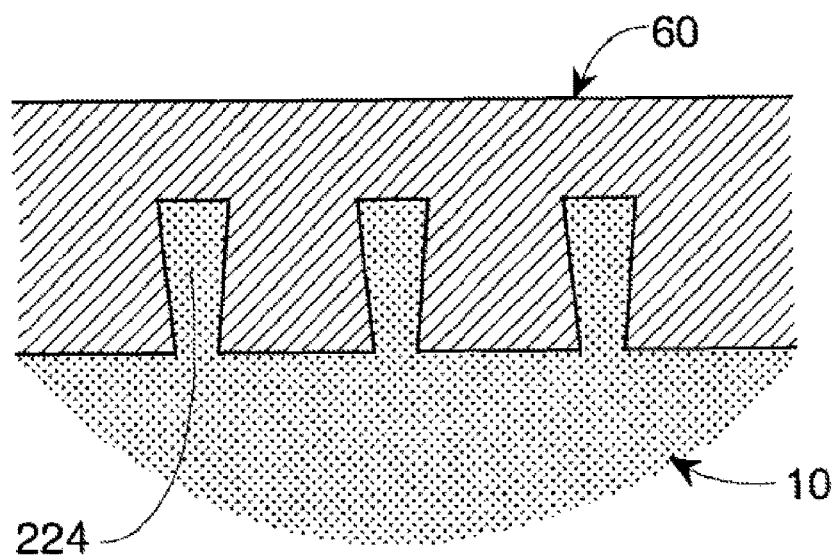
FIG. 12 shows a capillary cross sectional geometry embodiment with a wetting liquid.

This behavior can be seen in FIGS. 11 and 12 in which a three-dimensional plate 60 contains divergent sidewalls 221 and 222 respectively in one face of the plate. Sidewall 221 and sidewall 222 form an included angle $\delta$ and a void space 224. These divergent side walls 221 and 222 may be used to represent pores, capillaries, trenches, etc. that have expanding internal dimensions as they extend into the solid.

In one experiment the plates in FIG. 11 and FIG. 12 are fabricated from PLEXIGLAS® and the liquid is distilled water. Since distilled water on PLEXIGLAS® has a contact angle of about 75°, equation 3 predicts a transitional included angle of 30°.

In FIG. 11, the included angle $\delta$ is greater than the transitional included angle of 30° for water on PLEXIGLAS®, so water will not enter into the expanding vertices. However, in FIG. 12, the included angle $\delta$ is less than the transitional included angle, and complete filling of the void 224 takes place. These data indicate that three-dimensional pores having a taper angle may exhibit similar behavior.

Figure 14:
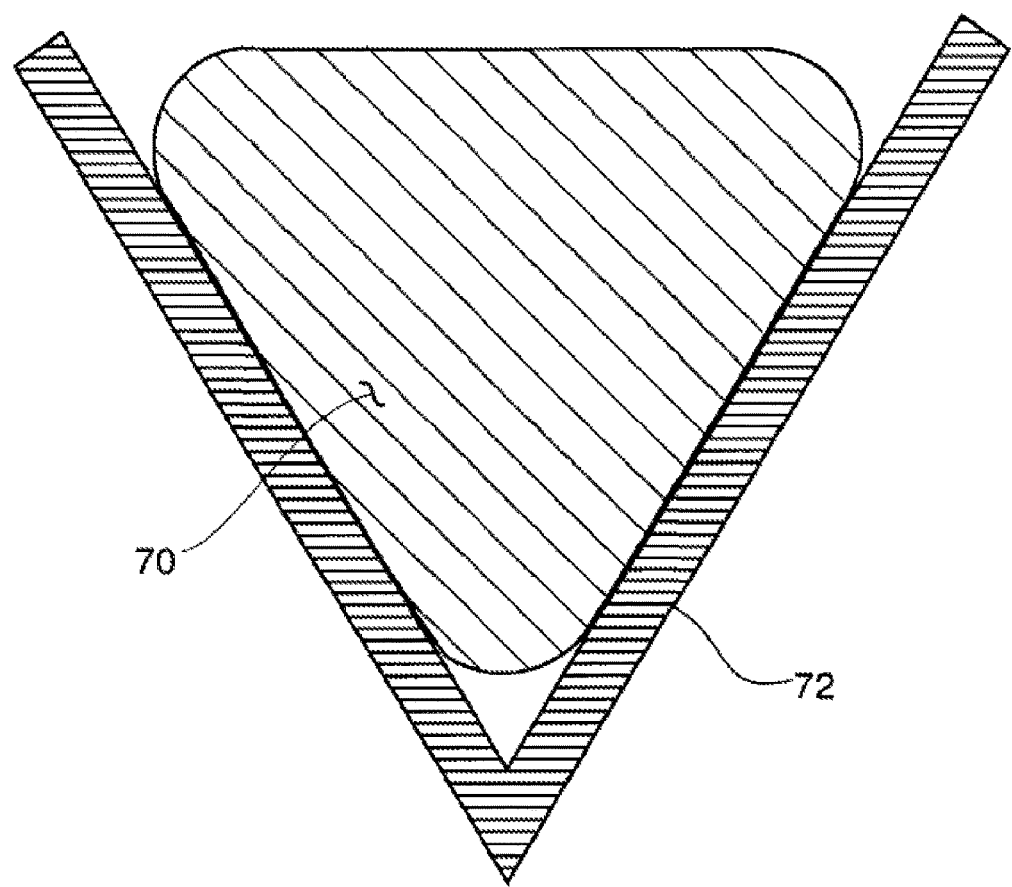
FIG. 14 shows an over-filled non-wetting V-shaped surface feature.
Figure 15:
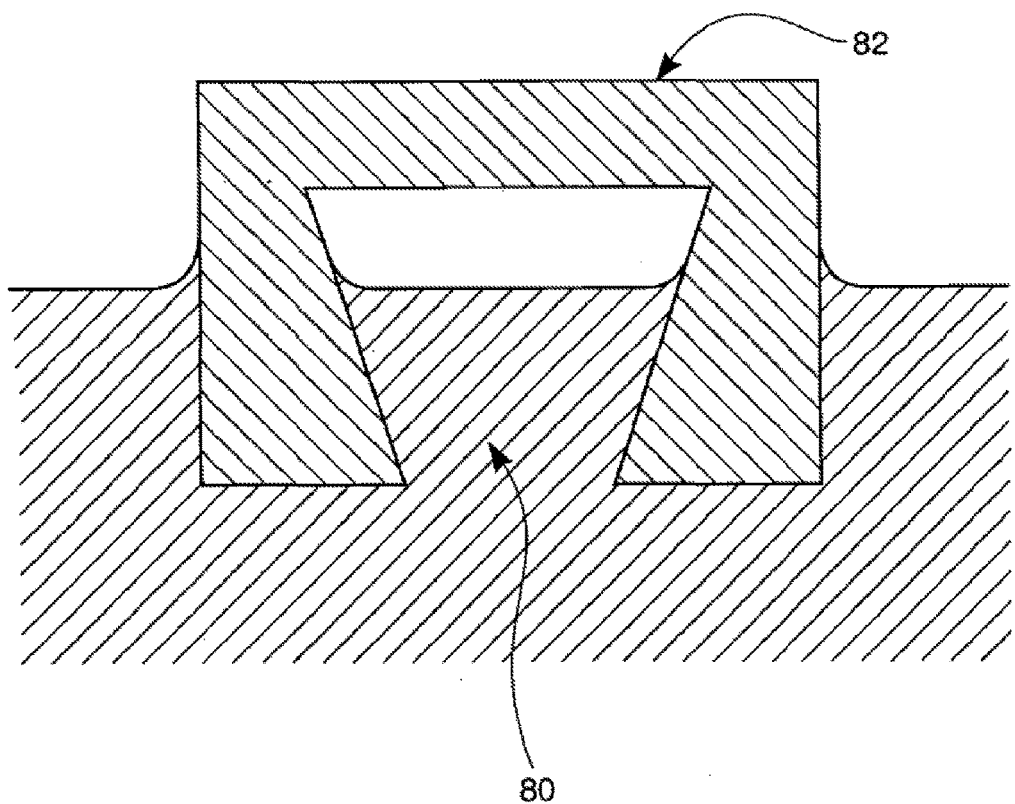
FIG. 15 shows an over-sized wetting shaped pore.

These modifications to wetting behavior as a function of geometry can occur on a variety of scales from the macro-scale to the nano-scale. It should be noted, however, that the amount of surface contact that actually takes place is also controlled by absolute size and/or spacing under certain circumstances. When the contact angle is greater than 90 degrees, incomplete filling takes place if the included angle has a magnitude less than the transitional included angle. This is shown in FIG. 4. If, however, the size of the drop 70 is greatly increased and the V-shaped feature 72 becomes very large, the drop liquid will simply fill the feature like water in a pond. This is illustrated in FIG. 14. If the size of the drop continues to grow and becomes great enough, the weight of the liquid will gradually force the filling of the vertex if it is below the liquid. Conversely, for liquid contact angles less than 90 degrees with surfaces having small feature pore dimensions, when the transitional included angle is greater than the included angle, only partial filling will take place. This is illustrated in FIG. 11. Again, if the size of the pore opening in FIG. 11 is greatly expanded as seen in FIG. 15, surface tension will no longer be able to constrain the liquid to a film-like partially-wetting shape, the liquid 80 will simply flow into the shaped-pore surface feature 82 like water into a swimming pool. Thus, very large surface-feature sizes and/or spacings, such as exhibited with wide deep grooves or large well-separated surface protrusions, such as posts or fins, are not within the scope of this invention. Such surface elements will not enable liquids contained within them to assume drop-like geometries governed by surface tension and contact angle that are described in this invention. However, the presence of such widely-spaced surface elements will act to constrain the motion of any liquid immersed within such elements, thereby "pinning" the liquid more tightly to the surface than if it was smooth. This would certainly be of benefit in situations requiring good adhesion to a solid surface.

This alteration of the wetting behavior of a liquid on a particular surface by employing surface elements can be achieved in a number of different ways. For example, discrete objects, such as plates, posts, or hoodoos can be formed on a surface or attached to a surface. Alternatively, capillaries or shaped pores can be created within the surface. This patterning or shaping of the surface can involve all or just a portion of the surface, be regular or irregular, involve depressions or elevations, and can be accomplished by a variety of means, such as mechanical techniques, energetic beams, physical or chemical processes, as well as a combination of these such as in photo-lithography. This may enable a wettability change on the surface of the solid without changing the chemical character or surface energy of the solid.

Capillaries with Axial Variable Geometry

Figure 13:
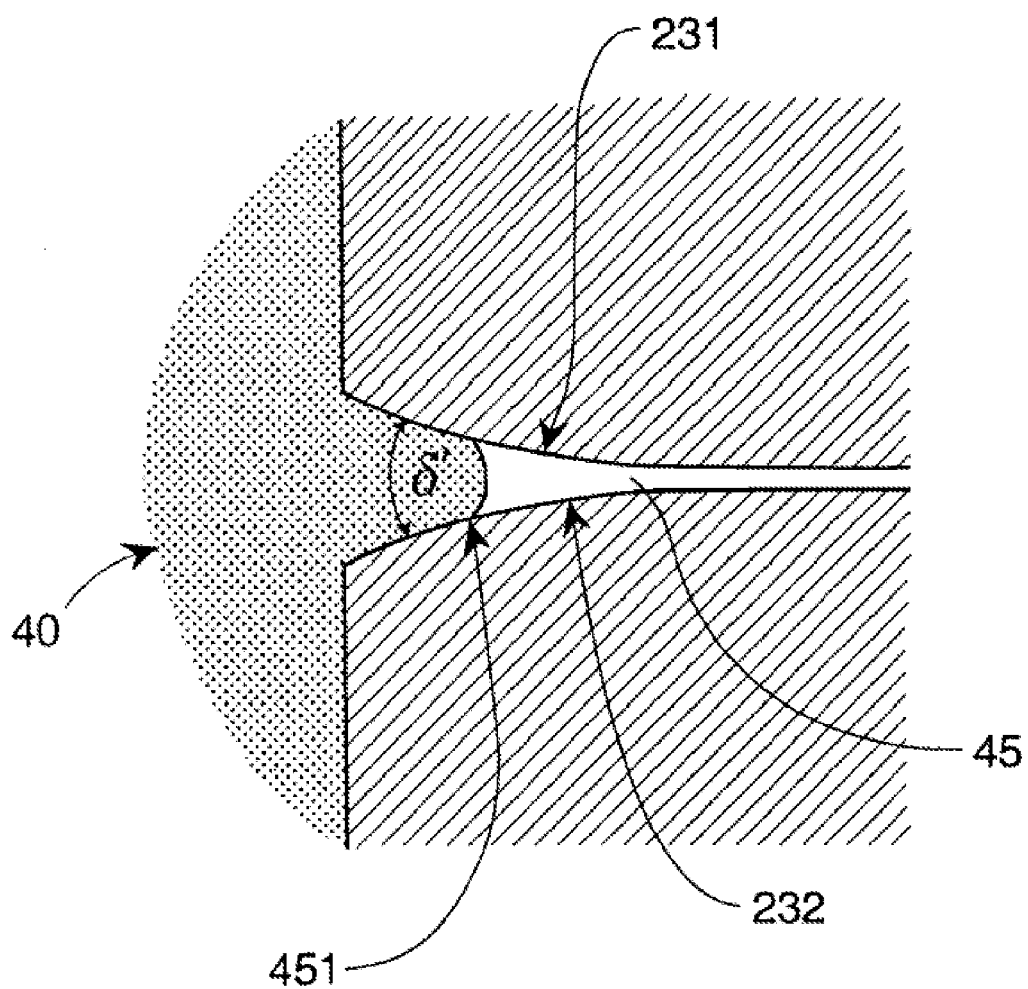
FIG. 13 shows a tapered capillary cross-section.

In some embodiments, the capillary cross sectional geometry may vary along a length of the capillary channel as in FIG. 13. FIG. 13 shows a side view of a round capillary 40 with a variable axial geometry. The capillary 40 has a tapered capillary path 45. The taper varies along the capillary path 45. The included angle $\delta'$ between the opposing capillary sides 231 and 232 may be orthogonal to the included angles $\delta'$ in FIGS. 8A and 8B although it need not be. In this example, the non-wetting liquid 10 will enter the capillary 40 until it reaches a point 451 in the capillary path 45 when the transitional included angle $\phi_{tw}$ for the particular liquid-solid material is reached. Although not shown, the capillary can also have a constant taper. In this instance, a non-wetting liquid with either enter the capillary or be denied access on the basis of the parameters in equation 1. In addition, the tapered capillaries can possess other cross-sectional shapes.

Other embodiments with tapered capillaries can be employed with wetting liquids. That is, tapered capillaries with the smaller end exposed to a wetting liquid can be used to allow or deny access of the wetting liquid into the capillary. It should be noted that these tapered capillaries like other capillaries in this application can be joined together to produce multi-function capillaries. For example, la tapered capillary can be joined at its smaller end to a linear capillary having the same diameter as the smaller end. This linear capillary can then be exposed to a wetting fluid. Now, if the taper is greater than the transitional included angle fluid penetration will stop at the beginning of the taper.

Dissimilar Surfaces

The opposing surfaces forming the included angle $\delta$ may be made of different materials and have different contact angles with the liquid. If the contact angles are not equal, but relatively similar, symmetry of the shape of the drop within the wedge-shaped included angle may be altered. The drop may contact the plate with the larger contact angle at a point closer to the vertex, and the transitional included angle $\phi_t$, may also be altered. In the extreme case of one plate being completely wetted by the liquid (contact angle of zero) and the other plate having a very large contact angle (approaching 180 degrees), the drop will spread out over the zero-contact-angle plate as much as possible, and attempt to not contact the other plate at all. This could be useful in applications where different material properties, such as emissivity or color, are desired to be observed when viewing the overall surface from different angles.

Wicking Behavior

In certain applications, such as heat pipe and spacecraft fuel tanks during zero gravity conditions, it is necessary for the liquid to spontaneously move from one location to another on the overall surface entirely because of capillary forces. This migrating behavior is commonly referred to as "wicking", and only occurs on planar surfaces if the contact angle approaches zero. If, however, the overall surface is covered with inverted V-shaped features, for example, that have an included angle $\delta$ less than the transitional included angle $\phi_{tw}$, the wetting liquid will increase both its contact with the surface and the volume of liquid being wicked considerably enhancing the wicking action. This is because the actual area of contact between the liquid and the solid surface has been increased. On the contrary, if the included angle $\delta$ is greater than the transitional included angle $\phi_{tw}$ some decrease in wicking activity in comparison to the flat surface will occur. By varying the included angle, it is possible to control the location on the overall surface to which the liquid will migrate.

Variable Area of Solid-Liquid Contact

In the preceding examples the solid-liquid contact angle $\theta$ between the liquid and the solid has been assumed constant, which means that the transitional included angle, $\phi_t$, calculated from either equation 1 or equation 3 is also constant. It is possible to change the solid-liquid contact angle $\theta$ by changing either the properties of the liquid and/or of the solid surface. This may be accomplished in any number of ways. For example, the temperature of the liquid can be changed, an electric field can be applied to the liquid, or the character of the liquid can be changed, for example, by combining with another liquid. In addition, the character of the surface can be modified by employing a heat-sensitive or light-sensitive coating, for example.

By purposeful selection of the material and surface characteristics of solids and the contacting liquids the degree of solid-liquid contact can be controlled. Through proper selection of the contact angle $\theta$ and included angle $\delta$, the transitional included angle $\phi_t$ for the system can be fixed at a value close to that of the included angle $\delta$ of the surface features. In this case, a slight change in the liquid solid contact angle $\theta$ caused by changes in the liquid surface tension or by changes in the character of the surface will increase or decrease the area of contact between the liquid and the surface. Thus, the degree of wetting of the surface can be controlled by parameters, such as, temperature, radiation, and electromagnetic fields.

Phase-Change Surfaces

Whenever two-phase fluid separation, including phase transformation, takes place on surfaces in a liquid-vapor system, important opportunities exist for enhancing and controlling the efficiency of these processes. Such processes occur when heat transfer takes place during condensation or vaporization/boiling, or when chemical reactions take place on surfaces, such as those of electrodes or catalysts. These opportunities are a direct result of the understanding that modifying such surfaces with the previously-described surface features with a specific desired geometry will cause one of these evolving phases to either be fully contacted with, or be partially reject from the modified surface. This concept differs from the one previously described (FIG. 9) that separates a mixture of two or more phases by contacting the mixture with geometrically-modified surfaces, because in the previous example the composition of these systems remained fixed, i.e., the overall mass or weight ratio of one phase to another did not change with time. Even if flow took place, the inlet and outlet phase-weight ratios of such liquid-vapor systems did not change. In the present embodiment, the phase-weight ratio of the liquid-vapor systems does change with time, and the controlling parameter is now dynamic contact angle rather than static contact angle.

An excellent example of this behavior is condensation of water vapor into liquid water on a surface that is being cooled, such as in the outlet (condenser) end of a steam turbine in a power plant. In this example predominately vapor is provided to the cold surface. If the surface of the condenser is made from or coated with a material that has a contact angle with water that is greater than 110 degrees, for example, and features with the desired geometry, such as, V-shaped grooves are machined into the surface of this condenser material that have a transitional included angle smaller than 30 degrees (refer to equation (1)), then these grooves will not be fully contacted by the water as it turns from a vapor into a liquid (as in FIG. 4). Moreover, as the size of the water droplet increases, due to condensation, it can be demonstrated that the droplet will move further and further from the vertex, 231 in FIG. 4 if the vertex is not below the droplet. Thus, the water droplet will be forcefully ejected from the groove, thereby clearing the surface for additional condensation to take place. This self-clearing ability of such a surface overcomes one of the most difficult problems associated with design of condensers. That is, the fact that heat transfer through a liquid layer is typically much smaller than through the condenser walls. This is certainly true for water. Thus, if a continuous water film forms on the condenser walls, the overall heat transfer coefficient used to size the condenser is greatly reduced. This reduction can be as large as an order of magnitude. Needless to say, the enlarging effect on condenser size is also appreciable. The present invention is in contrast to the prior art in which surface elements, such as grooves, pits, and roughness in the surface and other elements, such as fins and posts, are added principally to increase total surface area for condensation to occur. It should be noted that although the total surface area in the prior art is increased, a portion of this surface area is not effective because some of the elements tend to clog with fluid. In contrast, in the instant invention surface features with a desired specific geometry are placed in the surface to principally increase the area that will expel fluid, clearing the surface for further condensation. A similar argument can be made for formation of a liquid on an electrode or catalytic surface. In these situations, however, the original phase could be a vapor or a non-miscible liquid having a contact angle smaller than the liquid product phase.

Looking at the reverse process, it is worth noting that when steam is formed in a boiler, it will be ejected from the boiler surface that is being heated provided that water now wets the boiler surface. In this example predominately liquid is provided to the boiler surface. The steam will behave in the same manner as liquid water in the condenser example described above because continuous filling (or wicking) of the liquid water will take place within the V-shaped surface features, and steam, being a vapor, cannot make a contact angle with a solid surface. The reason for this is that contact angle is a physical property of liquids only. Thus, the water will fill the V-shaped surface features which will be inaccessible to the bubbles. Again this self-cleaning property will greatly increase the overall heat-transfer coefficient, thereby reducing the required boiler surface area for a given power output.

This concept is in contrast to the prior art in which surface features, such as grooves, pits, and roughness in the surface and other elements, such as fins, are added principally to increase total surface area for vaporization to occur. In the instant invention surface features with a desired specific geometry are placed in the surface to increase the area that is available to liquid and not to vapor bubbles in order to enhance vaporization. Again, the same logic can be applied to an electrode, catalyst, and other surfaces. It should be noted that for both vaporization and condensation, it is not necessary for the surface with features in the surface be horizontal or planar.

Another opportunity that exists for utilization of the instant invention occurs when heat transfer takes place on surfaces and not only does the liquid-vapor phase-weight ratio change between inlet and outlet of the phase-change surface, but the molecular composition of the phases themselves changes. Up until now, the phases were assumed to be composed of a single molecular species. This does not have to be the case. In a distillation column, for example, not only does the mass or weight ratio of liquid phase to vapor phase change throughout the distillation column, but the molecular composition of the liquid and vapor phases themselves changes from top to bottom of the distillation column. After all, this is the whole purpose of the distillation process. By providing surface features described for the condenser above, the self-clearing behavior encouraged will enhance the liquid-vapor contact taking place on any given plate of the distillation column, thereby moving the plate efficiency (ratio of actual species separation taking place to the theoretical separation possible, expressed as percent) towards 100%.

Figure 16:
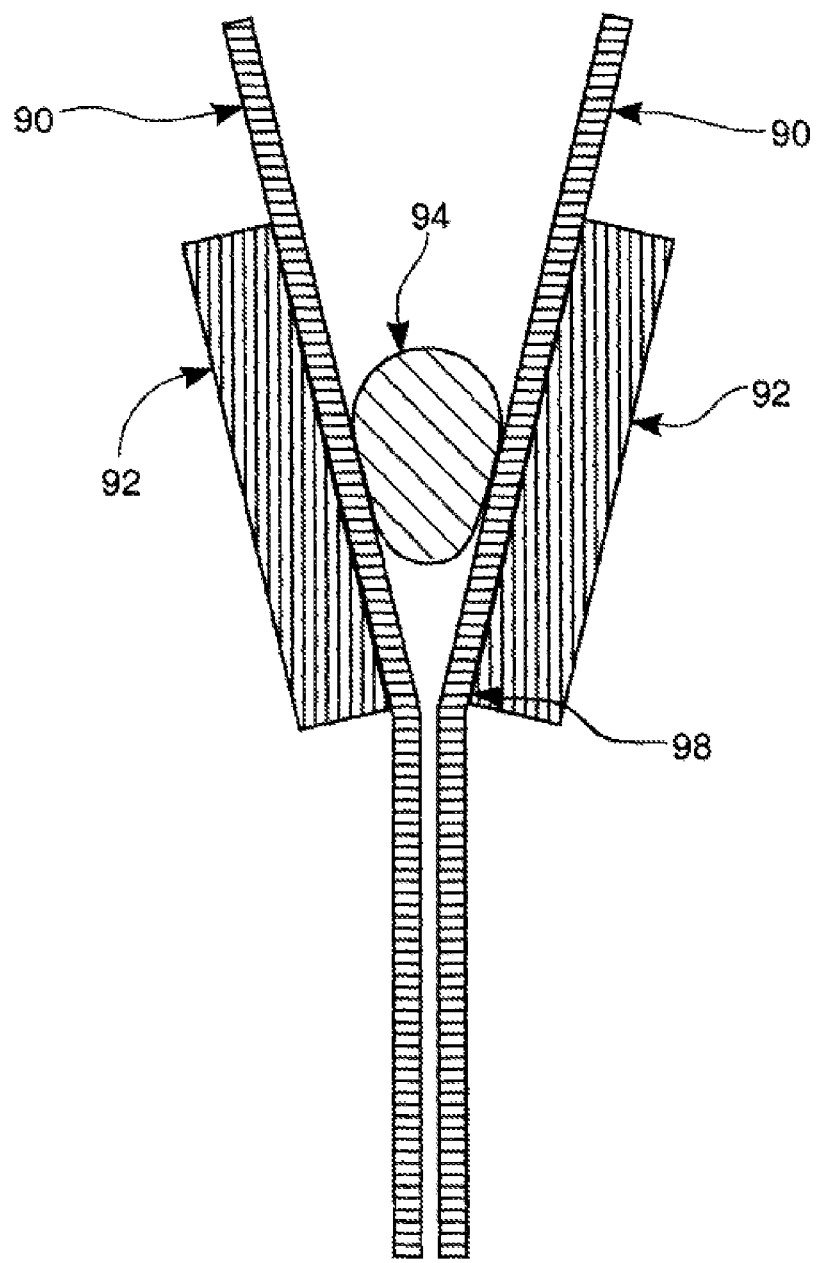
FIG. 16 shows a dynamic contact measuring technique using moving tapes.
Figure 17:
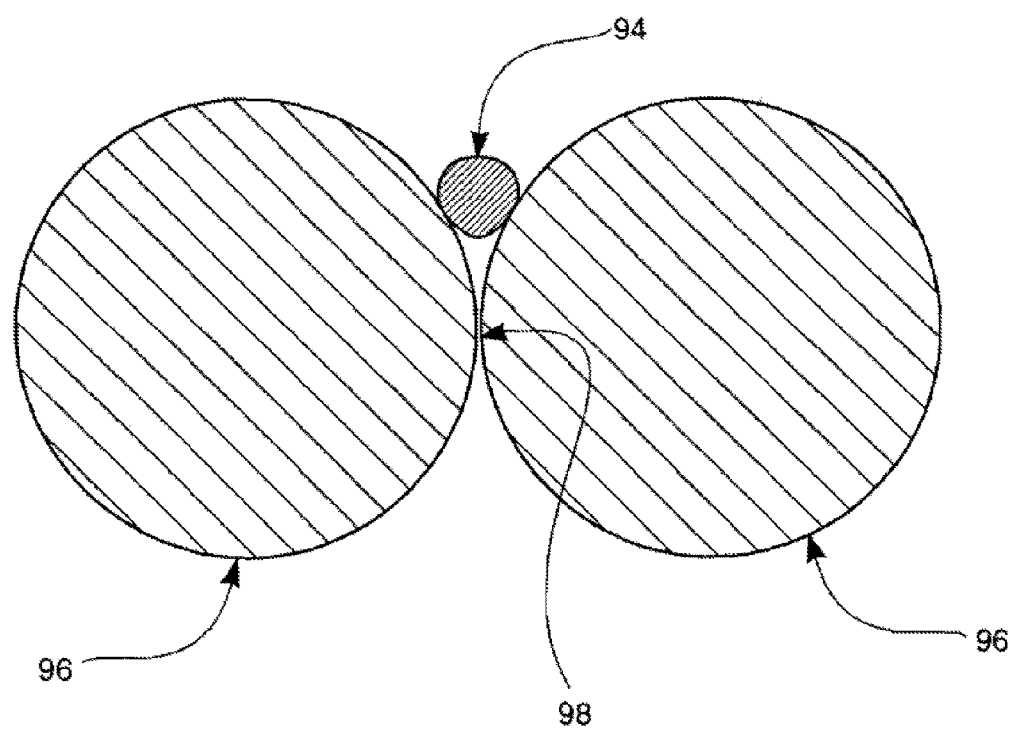
FIG. 17 shows a dynamic contact angle measuring technique using rotating cylinders.

In addition, it is interesting to observe that this behavior of liquids, either vaporizing or condensing in such surface features, could provide a technique for actually measuring dynamic contact angles. Currently, measurements of the advancing and receding contact angles are made by adding or removing liquid from a drop (captive drop goniometry), tilting a plate with a drop on it (tilting plate goniometry), or immersing a solid sample into or emersing it from the test liquid (Wilhelmy-balance tensiometry). All these methods require a microscope, a knowledge and control of the orientation of the sample or plate, and preferably an algorithm for data analysis. One method for carrying out the dynamic contact angle measurement using this invention would simply involve observing the liquid within the surface feature as a function of time. Another, perhaps easier method is to move the actual sides of the surface feature relative to the liquid droplet. This would do away with having to change the volume of the drop by either condensation or evaporation, or by the addition or withdrawal of liquid from the drop. This relative movement can be accomplished using tapes either, continuous or non-continuous 90, pulled up the sides of the "V-shaped" surface feature sidewall 92 as illustrated in FIG. 16, or by using closely spaced, or even touching, rotating cylinders 96 as shown in FIG. 17. The liquid 94 would be placed in the gap near the point of minimum separation of the surface features 98 between the tapes or cylinders which are coated with or fabricated from the surface material of interest. By altering the speed of the tapes or cylinders, the position of the drop will change if the dynamic contact angle changes with velocity. This offers the capability of measuring the dynamic contact angle as a function of velocity. In addition, with these techniques contact angles can be measured at velocities that are orders of magnitude greater than is possible with conventional techniques. The drop will not change its position once the speed has become constant, making the measurement very similar to the static-contact-angle measuring techniques. A step-wise measuring technique could also be developed by changing the included angle in a V-shaped channel. A non-wetting drop would be stopped at the juncture between the two angles by designing the increase in angles correctly.

These methods have the added benefit that the dynamic contact angle would not change with time, only with cylinder rotation speed or tape velocity. Moreover, by changing the cylinder rotation direction or tape motion direction from both toward the point of minimum separation to both away from the point of minimum separation, advancing as well as receding dynamic contact angles can be measured. An additional variation of this concept would be to have one cylinder or tape moving upwards and the other downwards. This physical situation is, in fact, encountered in many commercial coating applications such as roll-layering and film-spreading processes.

Self-Clearing Vents Based on Droplet Expulsion

There are many applications where a microporous hydrophobic membrane material made by sintering PTFE (Teflon®) or another polymeric material is used to allow air, vapor, or another gas into or out of a container to equalize the pressure or prevent a vacuum from forming while at the same time not allowing liquid to pass through the membrane. Hundreds of millions of these vents have been manufactured for applications as diverse as storage and shipping containers that can breathe, medical device filtration and separation, amplifier and antenna vent filters, GPS/navigation micro filters, venting of automobile headlights and ABS brakes, marine lighting water repellent venting, instrument cluster protective micro filters, bag and tubing vents, as well as military equipment protective vents for harsh environments to name a few.

These packaging vents manufactured from PTFE as well as polypropylene, polyethylene, polyvinylidene fluoride, acrylic copolymer, and polyethersulfone polymer are supplied by numerous companies, such as Gore, Pall, Porex, Millipore, and Siemens. The vents work very well in low humidity or low vapor pressure environments while in high humidity and high vapor pressure environments their performance is degraded. In many applications, such as in baby bottles and infant drinking cups as well as medical containers and devices, it is required to wash and sanitize the container for subsequent use. When a microporous hydrophobic material is used as a vent in one of these containers, it is flooded and thus is clogged by water during the dishwasher cycle. In this condition it is useless until the condensed water vapor in the micropores evaporates. This flooding of the membrane is due to the fact that a microporous hydrophobic material will not let water into its pores while vapor in the form of steam is free to enter the structure and condense inside the porous structure. Thus, there is a need for a non-porous vent that will not flood and subsequently cease to function when vapor condenses on the surface of the vent.

Figure 18:
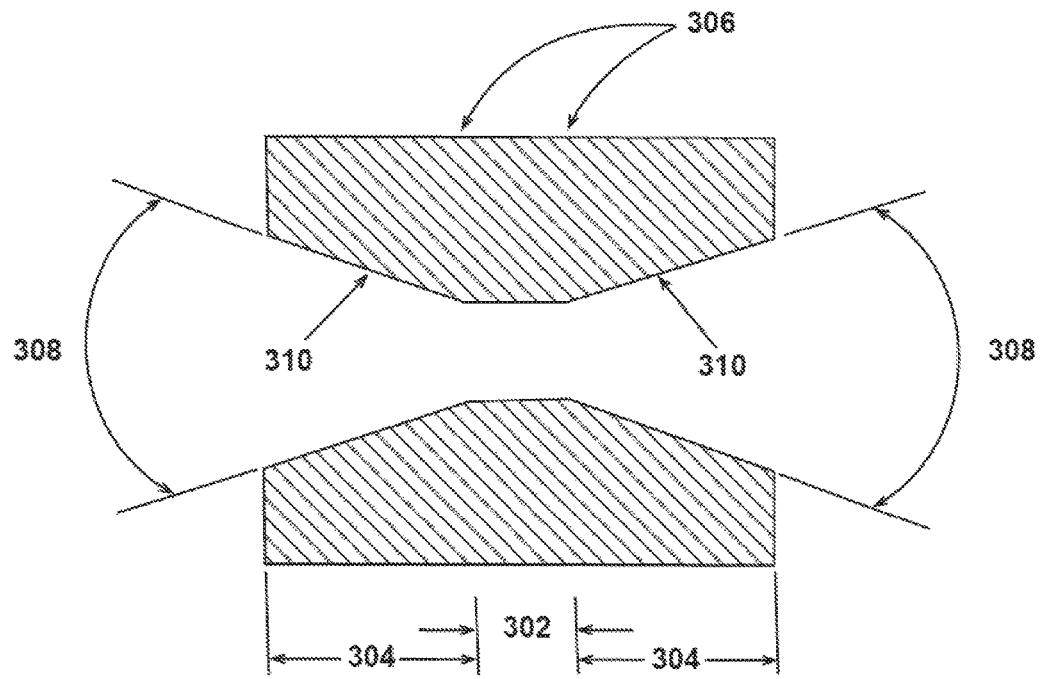
FIG. 18 is a section view of a vent consistent with embodiments of the invention.

Based on the principle of the transitional included angle, it is possible to produce a vent that allows the passage of a gas or a vapor through the vent, excludes the passage of liquid through the vent, and, in addition, automatically removes condensed vapor from the interior surfaces of the vent. Thus, the vent is self-clearing and cannot be clogged by condensing vapor. As seen in FIG. 18, the vent comprises a metering section to which the two halves of the vent are attached axially along the major axis of the vent at their minimum dimensions i.e. truncated vertexes. Each half of the vent possesses at least one geometric feature with each geometric feature having at least one included angle and an ever expanding region from the truncated vertex in the direction of droplet expulsion.

Figure 19:
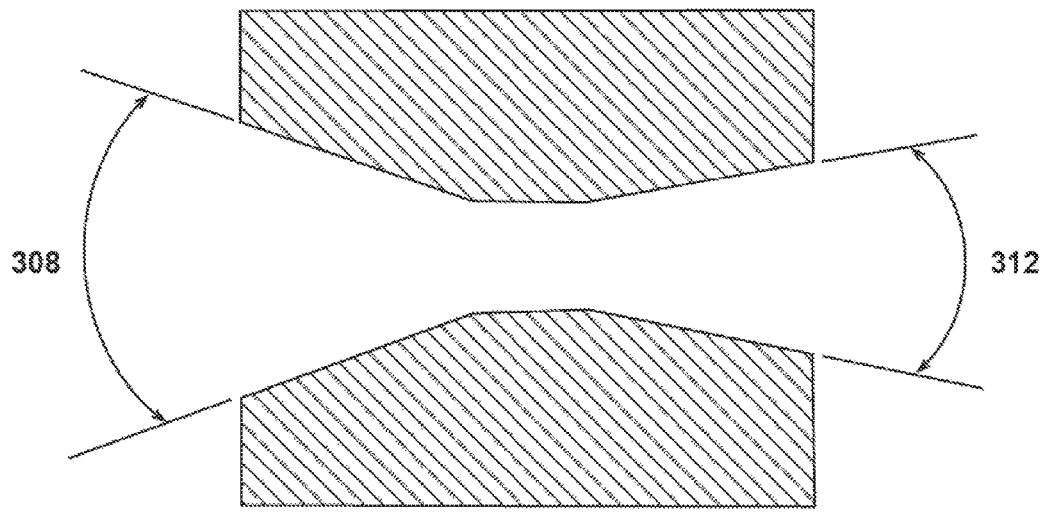
FIG. 19 is a section view of an alternate vent consistent with embodiments of the invention.

The included angles in each half of the vent with at least one geometric feature are each formed by at least two pairs of opposing faces and they can be different i.e. 308 & 312 in FIG. 19. The magnitude of each included angle is specified in order to determine the area of contact between the liquid and the solid surface and is based at least in part upon the calculated transitional included angle, which is the included angle that differentiates complete liquid contact and partial liquid contact with the surface features.

For the vents described in this invention to function, the liquid to be excluded must have a contact angle with the surface of the vent equal to at least 90° and preferably greater than 150°. If the material used to manufacture these vents has the required contact angle with the liquid to be excluded, it can be utilized. If not, the surfaces of the vent can be surface-treated or coated with another material(s) in order to achieve these contact angles. Utilizing the concepts of this invention, the required included angle between opposing surfaces of each half of the vent with at least one geometric feature is determined from equation (1). The vent is fabricated with two halves in such a manner that the included angle between opposing surfaces in each half of the vent is less than the transitional included angle. The two halves can be mirror images of each other although this is not required. Alternatively they can be very different with the included angle and/or the internal shape being different. All that is required is that the included angle between opposing faces in the vent be less than the transitional included angle. With this angle, the liquid to be excluded by the vent is only partially contacting the surface of the vent. Thus, as vapor condenses on the surface of the vent and a droplet is formed, it will not be fully contacting the surface of the vent (as in FIG. 4). Moreover, as the size of the liquid droplet increases, due to condensation, it can be demonstrated that the droplet will move further and further from the vertex, 231 in FIG. 4 if the vertex is not below the droplet. Thus, the liquid droplet will automatically be forcefully ejected from the vent, thereby clearing the surface of the vent for additional condensation to take place. It should be noted that even if the vertex is below the droplet, the droplet can be removed by changing the orientation of the vent.

This invention will work with any gas, vapor, or liquid regardless of surface tension of the liquid as long as the contact angle between the liquid and the surface is at least 90° and preferably greater than 150°. It should also be noted that there is no limit to the number of vents that can be placed in any container.

Figure 20A:
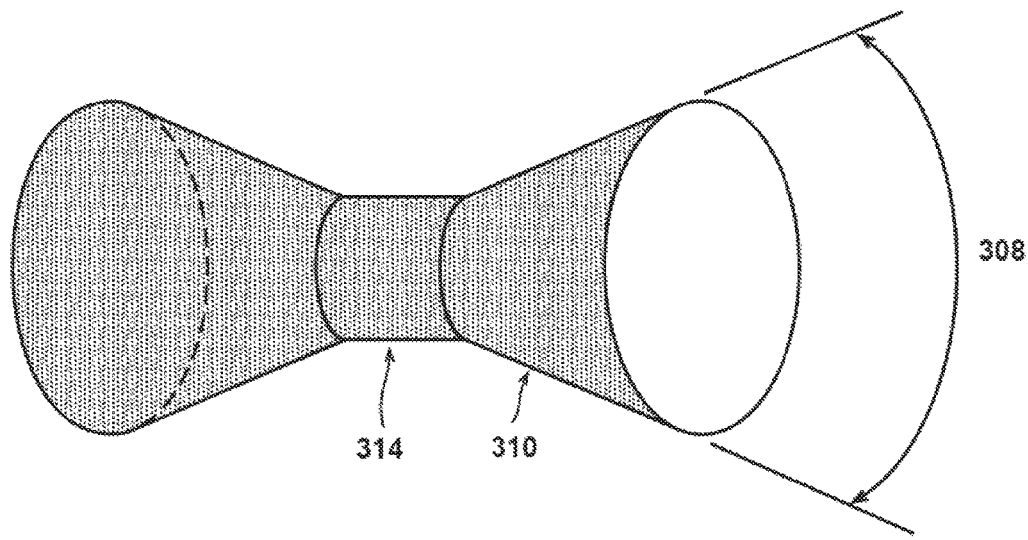
FIG. 20A is a perspective view of an inner surface of a conical vent consistent with embodiments of the invention.
Figure 20B:
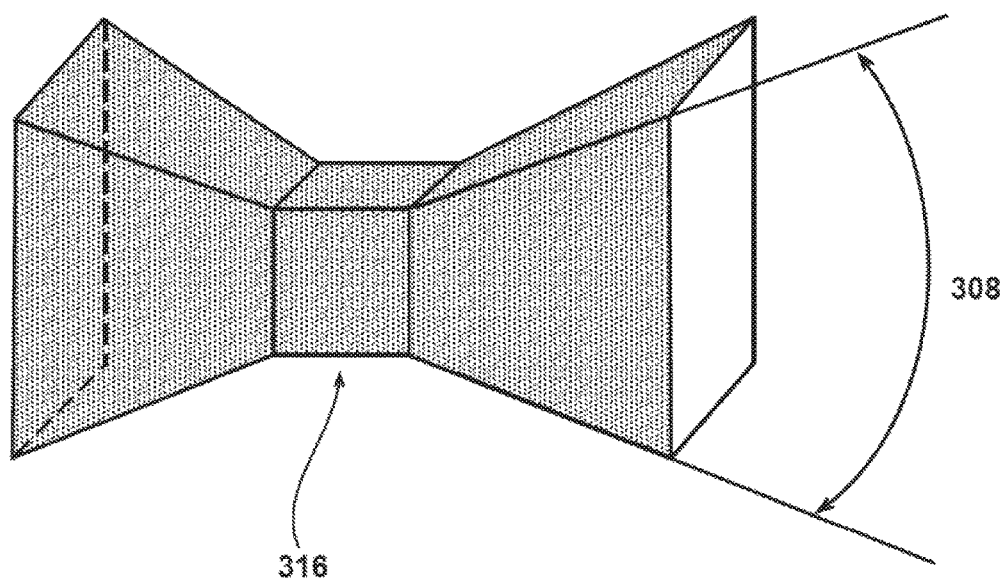
FIG. 20B is a perspective view of an inner surface of a pyramidal prism shaped vent consistent with embodiments of the invention.
Figure 20C:
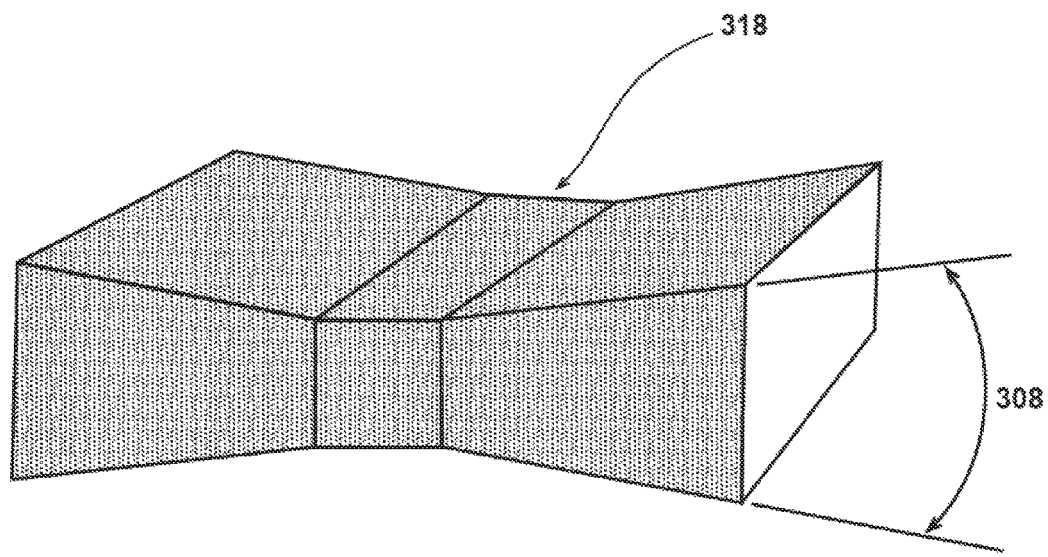
FIG. 20C is a perspective view of an inner surface of a rectangular metering section with a trapezoidal prism shaped vent consistent with embodiments of the invention.
Figure 20D:
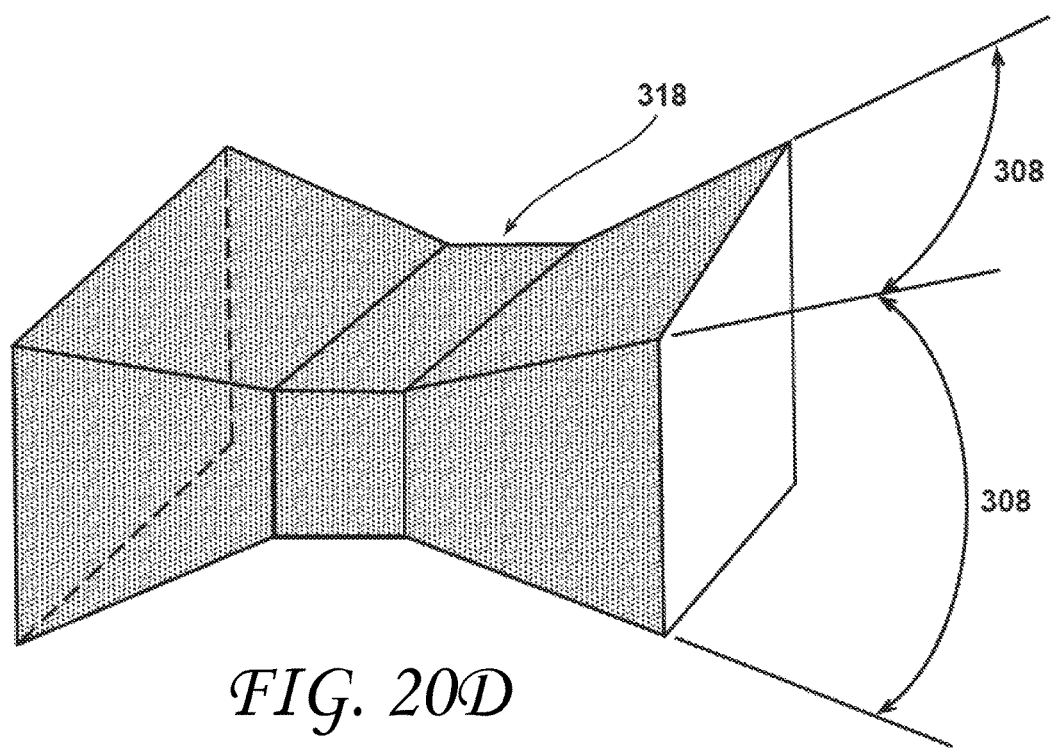
FIG. 20D is a perspective view of an inner surface to an alternate rectangular metering section with a trapezoidal prism shaped vent consistent with embodiments of the invention.

In this invention, the metering section connected to the truncated vertices of the two halves of the vent controls the flow of the air, vapor or other gas through the vent in addition to determining the pressure required for liquid to pass through the vent. For this reason, a contact angle between the liquid to be excluded and the surface of the vent of at least 150° is preferable over a contact angle of 90° because the higher contact angle will allow the magnitude of the minimum dimension of the metering section to be greater allowing more air or vapor to pass through while still excluding the liquid. Ideally the metering section should have zero length but this is impossible to manufacture. Thus, the metering section has a length L, a maximum separation dimension of D between the walls along its length that is essentially constant, and an L/D less than one. With this L/D ratio, the droplet is unstable as it grows inside the metering section and will automatically be ejected. The metering section can possess any cross-sectional or axial shape as long as the maximum separation dimension of D between the walls along its length does not vary by more than +10%. It can possess any cross-sectional shape as long as at least two opposing surfaces of each vent half with at least one geometric feature form the required included angle. For example, if each half of the vent has a truncated conical shape (FIG. 20A), the metering section joined to the truncated vertices of the vent halves is circular 314. Alternatively, a square metering section 316 can be formed from the truncated ends of pyramidal prism vent halves (FIG. 20B). If the metering section connected to the truncated vertices of the vent halves is rectangular 318, each half of the vent can have a trapezoidal prism shape (FIG. 20C) In this example, only one pair of sides for the required included angle 308. Alternatively both faces of the prism can form the appropriate included angle 308 (FIG. 20D). Although the metering section joined to the truncated vertices of the vent can have numerous different shapes, one of the preferred shapes is rectangular. The reason for this is that a long narrow rectangular opening in a vent is not easily blocked by particulate material or by droplets as they grow and are expelled.

For the sake of simplicity, individual vents have been shown. It should be noted that an enclosure to be vented can be vented by more than one metering section in or on the wall. For example, these can be placed next to each other in the same location, in a circular arrangement at a single position, as well as in or on a different area of the wall of the container. If they are arranged in a circular fashion, the vent comprises at least one radial metering section to which the two halves of the vent each containing at least one included angle as well as an ever expanding region are attached radially along the same radius as the metering section of the valve at their minimum dimension i.e. truncated vertex. If there are two or more metering sections in close proximity, each end of the metering section can either be joined to a discrete vent halve containing at least one included angle as well as an ever expanding region or each end of the at least two metering sections can share common vent halves each containing at least one included angle as well as an ever expanding region.

Moreover, the use of two or more metering sections in close proximity to one another enables the concept of automatic dimension control. That is, not only is there a simplicity in manufacture, but it is also possible to have uniform dimensions in all metering sections as well as control over the maximum dimension of all the metering sections. Multiple metering sections in close proximity to one another also allows smaller cross-sectional dimensions of each metering section as compared to a single larger rectangular cross-section with the same gas or vapor throughput. Additionally, the fact that the metering sections have a smaller lateral dimension increases the mechanical stability of the vent.

To this point, the applications described for these self-clearing vents have been limited to vents that allow the passage of gas and vapor while expelling any liquid that forms in the vent. It needs to be mentioned that if these vents operate in a reverse mode, they can be employed as over-pressure relief valves for liquids. That is, if the pressure on a liquid in a container increases, at some point, the pressure on the liquid will force the liquid all the way into the vent half with at least one geometric feature. In addition, at some pressure the liquid will be able to flow through the metering section and exit the other side of the vent. These relief pressures are determined by the dimensions of the metering section in conjunction with the contact angle between the liquid and the interior surface of the vent.

Capillaries with Axial Variable Geometry

In some embodiments, the capillary cross sectional geometry may vary along a length of the capillary channel as in FIG. 13. FIG. 13 shows a side view of a round capillary 40 with a variable axial geometry. The capillary 40 has a tapered capillary path 45. The taper varies along the capillary path 45. The included angle $\delta'$ between the opposing capillary sides 231 and 232 may be orthogonal to the included angles $\delta'$ in FIGS. 8A and 8B, although it need not be. In this example, the non-wetting liquid 10 will enter the capillary 40 until it reaches a point 451 in the capillary path 45 when the transitional included angle $\phi_{tw}$ for the particular liquid-solid material is reached. Although not shown, the capillary can also have a constant taper. In this instance, a non-wetting liquid will either enter the capillary or be denied access on the basis of the parameters in equation 1. In addition, the tapered capillaries can possess other cross-sectional shapes.

Other embodiments with tapered capillaries can be employed with wetting liquids. That is, tapered capillaries with the smaller end exposed to a wetting liquid can be used to allow or deny access of the wetting liquid into the capillary. It should be noted that these tapered capillaries like other capillaries in this application can be joined together to produce multi-function capillaries. For example, a tapered capillary can be joined at its smaller end to a linear capillary having the same diameter as the smaller end. This linear capillary can then be exposed to a wetting fluid. Now, if the taper is greater than the transitional included angle fluid penetration will stop at the beginning of the taper.

Dissimilar Surfaces

The opposing surfaces forming the included angle $\delta$ may be made of different materials and have different contact angles with the liquid. If the contact angles are not equal, but relatively similar, symmetry of the shape of the drop within the wedge-shaped included angle may be altered. The drop may contact the plate with the larger contact angle at a point closer to the vertex, and the transitional included angle $\phi_t$ may also be altered. In the extreme case of one plate being completely wetted by the liquid (contact angle of zero) and the other plate having a very large contact angle (approaching 180 degrees), the drop will spread out over the zero-contact-angle plate as much as possible, and attempt to not contact the other plate at all. This could be useful in applications where different material properties, such as emissivity or color, are desired to be observed when viewing the overall surface from different angles.

Wicking Behavior

In certain applications, such as heat pipes and spacecraft fuel tanks during zero gravity conditions, it is necessary for the liquid to spontaneously move from one location to another on the overall surface entirely because of capillary forces. This migrating behavior is commonly referred to as "wicking", and only occurs on planar surfaces if the contact angle approaches zero. If, however, the overall surface is covered with inverted V-shaped features with open vertices, for example, that have an included angle $\delta$ less then the transitional included angle $\phi_{tw}$, the wetting liquid will increase both its contact with the surface and the volume of liquid being wicked considerably enhancing the wicking action. This is because the actual area of contact between the liquid and the solid surface has been increased. On the contrary, if the included angle $\delta$ is greater than the transitional included angle $\phi_{tw}$, some decrease in wicking activity in comparison to the flat surface will occur. By varying the included angle, it is possible to control the location on the overall surface to which the liquid will migrate.

Variable Area of Solid-Liquid Contact

In the preceding examples the solid-liquid contact angle $\theta$ between the liquid and the solid has been assumed constant, which means that the transitional included angle, $\phi_t$, calculated from either equation 1 or equation 3 is also constant. It is possible to change the solid-liquid contact angle $\theta$ by changing either the properties of the liquid and/or of the solid surface. This may be accomplished in any number of ways. For example, the temperature of the liquid can be changed, an electric field can be applied to the liquid, or the character of the liquid can be changed, for example, by combining with another miscible liquid or surfactant. In addition, the character of the surface can be modified by employing a heat-sensitive or light-sensitive coating, for example.

By purposeful selection of the material and surface characteristics of solids and the contacting liquids the degree of solid-liquid contact can be controlled. Through proper selection of the contact angle $\theta$ and included angle $\delta$, the transitional included angle $\phi_t$ for the system can be fixed at a value close to that of the included angle $\delta$ of the surface features. In this case, a slight change in the liquid solid contact angle $\theta$ caused by changes in the liquid surface tension or by changes in the character of the surface will increase or decrease the area of contact between the liquid and the surface. Thus, the degree of wetting of the surface can be controlled by parameters, such as, temperature, radiation, and electromagnetic fields.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A self-clearing vent that allows passage of a gas or a vapor through the vent and, when the vent is oriented above a liquid, which excludes passage of the liquid through the vent and clears condensation from the interior surfaces of the vent, the self-clearing vent comprising:

a. a capillary section between a first vent portion and a second vent portion, the capillary section, first vent portion, and second vent portions defining a passage therethrough, and having a first end and a second end aligned along a major axis of the self-clearing vent, the major axis corresponding to the direction of the passage, the capillary section having a length (L) along the major axis and an essentially constant interior dimension (D) between walls of the capillary section along its length and perpendicular to the length, wherein L/D is less than one;

b. the first vent portion attached to the first end of the capillary section at a proximal end, the first vent portion having a first included angle between a pair of opposing faces defining the passage through the first vent portion, the first vent portion having a truncated vertex where it attaches to the first end of the capillary section, and expanding from the truncated vertex to a first distal end;

c. the second vent portion attached to the second end of the capillary section at a proximal end, the second vent portion having a second included angle between a pair of opposing faces defining the passage through the second vent portion, the second vent portion having a truncated vertex where it attaches to the second end of the capillary section, and expanding from the truncated vertex to a second distal end;

d. the capillary section being attached to the first vent portion and second vent portion at their respective truncated vertex to form the passage for the gas or vapor through the capillary section and the attached first and second vent portions; and e. a surface of both the first vent portion and second vent portion each having a known contact angle of at least 90° with a liquid to be excluded, wherein the included angle between the pair of opposing faces in each vent portion is less than a transitional included angle for the pair of opposing faces with regard to the liquid to be excluded, wherein the transitional included angle is when the contacting behavior of the liquid changes from fully contacting to partial contacting or from partial contacting to fully contacting as the liquid begins to transition based off of its size and/or spacing of the pair of opposing faces, f. wherein the included angle is too small for liquid penetration through the capillary, and liquid is ejected from the self-clearing vent due to the interaction of the liquid with the faces of the first and second vent portions having a contact angle of at least 90° with the liquid, and the included angle between the pair of opposing faces in the first and second vent portions.

2. The self-clearing vent of claim 1, wherein the shape of the interior dimension of the capillary section is rectangular.

3. The self-clearing vent of claim 1, wherein the at least one pair of opposing faces in each of the first vent portion and the second vent portion are defined by one of a conical shape, the intersection of plates, non-circular shapes, a trapezoidal prism shape, and other three-dimensional shapes, respectively.

4. The self-clearing vent of claim 1, wherein the shape of the first and second vent portions and their included angles are not identical.

5. A self-clearing vent that allows passage of a gas or a vapor through the vent and, when the vent is oriented above a liquid, which excludes passage of a liquid through the vent and from the interior surfaces of the vent, the self-clearing vent comprising:

a. a plurality of capillary sections through a wall, each capillary section arranged between a first vent portion and a second vent portion, the capillary section, first vent portion, and second vent portion defining a passage therethrough, and having a first end and a second end aligned along a major axis of the self-clearing vent, the major axis corresponding to the direction of the passage, each of the capillary section having a length (L) along the major axis and an essentially constant interior dimension (D) between walls of the capillary section along its length, perpendicular to the length, wherein L/D is less than one;

b. each of the plurality of capillary portions having said first vent portion attached to the first end of its respective capillary section at a proximal end, each of the first vent portion having a first included angle between a pair of opposing faces defining the passage through each of the first vent portion, each of the first vent portion having a truncated vertex where it attaches to each of the first end of the capillary section, and expanding from each of the truncated vertex to a first distal end;

c. each of the plurality of capillary portions having said second vent portion attached to the second end of its respective capillary section at a proximal end, each of the second vent portion having a second included angle between a pair of opposing faces defining the passage through each of the second vent portion, each of the second vent portion having a truncated vertex where it attaches to each of the second end of the capillary section, and expanding from each of the truncated vertex to a second distal end;

d. each of the plurality of capillary sections being attached to its first vent portion and second vent portion at their respective truncated vertex to form passage for the gas or vapor through the capillary sections and their attached first and second vent portions; and e. a surface of each of said first vent portion and second vent portion having a known contact angle of at least 90° with a liquid to be excluded, wherein the included angle between the pair of opposing faces in each vent portion is less than a transitional included angle for each of the pair of opposing faces with regard to the liquid to be excluded, wherein the transitional included angle is when the contacting behavior of the liquid changes from fully contacting to partial contacting or from partial contacting to fully contacting as the liquid begins to transition based off of its size and/or spacing of the pair of opposing faces, f. wherein the included angle is too small for liquid penetration through the capillary, and liquid is ejected from the self-clearing vent due to the interaction of the liquid with each of the faces of the first and second vent portions having a contact angle of at least 90° with the liquid, and the included angle between each of the pair of opposing faces in the first and second vent portions.

6. The self-clearing vent of claim 5, wherein the plurality of capillary sections are arranged in one of a circular arrangement and an array in the wall.

* * * * *